United States Patent
Chen

(10) Patent No.: US 10,218,600 B2
(45) Date of Patent: Feb. 26, 2019

(54) PATH COMPUTATION ELEMENT HIERARCHICAL SOFTWARE DEFINED NETWORK CONTROL

(71) Applicant: Futurewei Technologies, Inc., Plano, TX (US)

(72) Inventor: Huaimo Chen, Bolton, MA (US)

(73) Assignee: Futurewei Technologies, Inc., Plano, TX (US)

( * ) Notice: Subject to any disclaimer, the term of this patent is extended or adjusted under 35 U.S.C. 154(b) by 87 days.

(21) Appl. No.: 15/391,319

(22) Filed: Dec. 27, 2016

(65) Prior Publication Data

US 2017/0244628 A1    Aug. 24, 2017

Related U.S. Application Data

(60) Provisional application No. 62/297,280, filed on Feb. 19, 2016.

(51) Int. Cl.
*H04L 12/733*    (2013.01)
*H04L 12/46*    (2006.01)
(Continued)

(52) U.S. Cl.
CPC ........ *H04L 45/122* (2013.01); *H04L 12/4633* (2013.01); *H04L 45/02* (2013.01);
(Continued)

(58) Field of Classification Search
CPC ....... H04L 45/122; H04L 45/02; H04L 45/04; H04L 45/507; H04L 12/4633; H04L 47/125
See application file for complete search history.

(56) References Cited

U.S. PATENT DOCUMENTS

| 2008/0219272 | A1* | 9/2008 | Novello | H04L 45/04 370/401 |
| 2012/0224506 | A1* | 9/2012 | Gredler | H04L 45/04 370/254 |

(Continued)

OTHER PUBLICATIONS

Chen, et al., "PCE Hierarchical SDNs," draft-chen-pce-h-sdns-01, Oct. 31, 2016, 66 pages.

(Continued)

*Primary Examiner* — Alex Skripnikov
*Assistant Examiner* — Liem H Nguyen
(74) *Attorney, Agent, or Firm* — Conley Rose, P.C.

(57) ABSTRACT

A parent PCE controller comprising a memory comprising instructions executable by a processor and a processor coupled to the memory and configured to execute the instructions. Executing the instructions causes the processor to establish a parent-child relationship with at least a first child PCE controller controlling a first domain and a second child PCE controller controlling a second domain, receive a request to create an E2E tunnel from a source to a destination crossing the first domain and the second domain, compute a shortest path from the source to the destination through the first domain and the second domain, transmit a request message to the first child PCE controller for creating a first tunnel segment of the E2E tunnel through the first domain, and transmit a request message to the second child PCE controller for creating a second tunnel segment of the E2E tunnel through the second domain.

20 Claims, 15 Drawing Sheets

(51) Int. Cl.
*H04L 12/715* (2013.01)
*H04L 12/723* (2013.01)
*H04L 12/751* (2013.01)
*H04L 12/803* (2013.01)
*H04L 12/44* (2006.01)

(52) U.S. Cl.
CPC ............ *H04L 45/04* (2013.01); *H04L 45/507* (2013.01); *H04L 47/125* (2013.01); *H04L 2012/445* (2013.01)

(56) References Cited

U.S. PATENT DOCUMENTS

| | | | | |
|---|---|---|---|---|
| 2013/0044641 | A1* | 2/2013 | Koponen | H04L 12/66 370/255 |
| 2013/0227146 | A1* | 8/2013 | Wang | H04L 47/724 709/226 |
| 2015/0098356 | A1* | 4/2015 | Bhattacharya | H04L 45/50 370/254 |
| 2015/0163125 | A1* | 6/2015 | Caviglia | H04L 45/44 370/254 |
| 2015/0249591 | A1* | 9/2015 | Alvarez | H04L 41/0803 370/252 |
| 2016/0269280 | A1* | 9/2016 | Lu | H04L 45/42 |
| 2017/0063685 | A1* | 3/2017 | Vedantham | H04L 45/02 |
| 2017/0223063 | A1* | 8/2017 | Herrero | H04L 63/0272 |

OTHER PUBLICATIONS

Hares, et al., "Administrative Domains and Routing Domains A Model for Routing in the Internet," RFC 1136, Dec. 1989, 10 pages.
Bradner, "Key Words for Use in RFCs to Indicate Requirement Levels," RFC 2119, Mar. 1997, 3 pages.
Katz, et al., "Traffic Engineering (TE) Extensions to OSPF Version 2," RFC 3630, Sep. 2003, 14 pages.
Le Roux, Ed., et al., "Requirements for Inter-Area MPLS Traffic Engineering," RFC 4105, Jun. 2005, 22 pages.
Zhang, Ed., et al., "MPLS Inter-Autonomous System (AS) Traffic Engineering (TE) Requirements," RFC 4216, Nov. 2005, 29 pages.
Farrel, et al., "A Path Computation Element (PCE)-Based Architecture," RFC 4655, Aug. 2006, 40 pages.
Li, et al., "IS-IS Extensions for Traffic Engineering," RFC 5305, Oct. 2008, 17 pages.
Shen, et al., "ISIS Extensions in Support of Inter-Autonomous System (AS) MPLS and GMPLS Traffic Engineering," RFC 5316, Dec. 2008, 19 pages.
Shen, et al., "OSPF Extensions in Support of Inter-Autonomous System (AS) MPLS and GMPLS Traffic Engineering," RFC 5392, Jan. 2009, 17 pages.
Vasseur, Ed., et al., "Path Computation Element (PCE) Communication Protocol (PCEP)," RFC 5440, Mar. 2009, 87 pages.
Vasseur, Ed. ,et al., "A Backward-Recursive PCE-Based Computation (BRPC) Procedure to Compute Shortest Constrained Inter-Domain Traffic Engineering Label Switched Paths," RFC 5441, Apr. 2009, 18 pages.
Zhao, Ed., et al., "Extensions to the Path Computation Element Communication Protocol (PCEP) for Point-to-Multipoint Traffic Engineering Label Switched Paths," RFC 6006, Sep. 2010, 33 pages.
King, Ed., et al., "The Application of the Path Computation Element Architecture to the Determination of a Sequence of Domains in MPLS and GMPLS," RFC 6805, Nov. 2012, 33 pages.
Culley, P., et al., "Marker PDU Aligned Framing for TCP Specification," RFC 5044, Oct. 2007, 74 pages.

\* cited by examiner

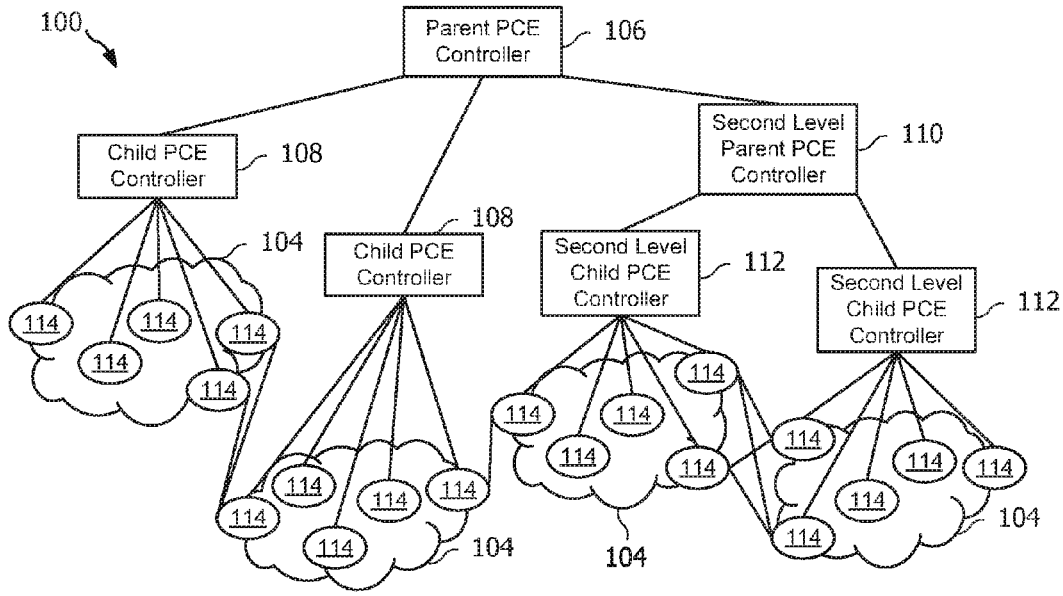
FIG. 1
```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Type = TBD1          |            Length             |
+-+-+-+-+-+-+-+-+-+-+-+-+-+-+-+-+-+-+-+-+-+-+-+-+-+-+-+-+-+-+-+-+
|                        Capability Flags                       |
+-+-+-+-+-+-+-+-+-+-+-+-+-+-+-+-+-+-+-+-+-+-+-+-+-+-+-+-+-+-+-+-+
|                       (Optional Sub-TLVs)                     |
~                                                               ~
+-+-+-+-+-+-+-+-+-+-+-+-+-+-+-+-+-+-+-+-+-+-+-+-+-+-+-+-+-+-+-+-+
```
FIG. 2
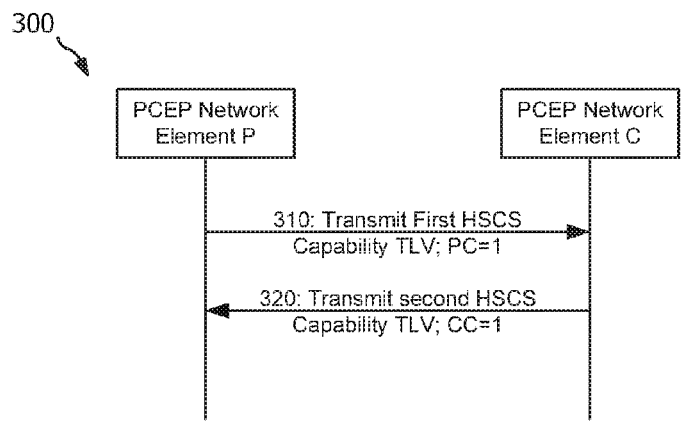
FIG. 3

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Type (1)           |           Length (1)          |
+-+-+-+-+-+-+-+-+-+-+-+-+-+-+-+-+-+-+-+-+-+-+-+-+-+-+-+-+-+-+-+-+
|                       Inter-Domain Link Type                  |
+-+-+-+-+-+-+-+-+-+-+-+-+-+-+-+-+-+-+-+-+-+-+-+-+-+-+-+-+-+-+-+-+
```

*FIG. 15*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Type (2)           |           Length (4)          |
+-+-+-+-+-+-+-+-+-+-+-+-+-+-+-+-+-+-+-+-+-+-+-+-+-+-+-+-+-+-+-+-+
|                       Remote AS Number                        |
+-+-+-+-+-+-+-+-+-+-+-+-+-+-+-+-+-+-+-+-+-+-+-+-+-+-+-+-+-+-+-+-+
```

*FIG. 16*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Type (3)           |           Length (4)          |
+-+-+-+-+-+-+-+-+-+-+-+-+-+-+-+-+-+-+-+-+-+-+-+-+-+-+-+-+-+-+-+-+
|                          Area Number                          |
+-+-+-+-+-+-+-+-+-+-+-+-+-+-+-+-+-+-+-+-+-+-+-+-+-+-+-+-+-+-+-+-+
```

*FIG. 17*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Type (4)           |           Length (4)          |
+-+-+-+-+-+-+-+-+-+-+-+-+-+-+-+-+-+-+-+-+-+-+-+-+-+-+-+-+-+-+-+-+
|                         OSPF Router ID                        |
+-+-+-+-+-+-+-+-+-+-+-+-+-+-+-+-+-+-+-+-+-+-+-+-+-+-+-+-+-+-+-+-+
```

*FIG. 18*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Type (5)           |           Length (6)          |
+-+-+-+-+-+-+-+-+-+-+-+-+-+-+-+-+-+-+-+-+-+-+-+-+-+-+-+-+-+-+-+-+
|                          ISO Node-ID                          |
+-+-+-+-+-+-+-+-+-+-+-+-+-+-+-+-+-+-+-+-+-+-+-+-+-+-+-+-+-+-+-+-+
```

*FIG. 19*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Type (6)           |           Length (4)          |
+-+-+-+-+-+-+-+-+-+-+-+-+-+-+-+-+-+-+-+-+-+-+-+-+-+-+-+-+-+-+-+-+
|                       IPv4 Remote ASBR ID                     |
+-+-+-+-+-+-+-+-+-+-+-+-+-+-+-+-+-+-+-+-+-+-+-+-+-+-+-+-+-+-+-+-+
```

*FIG. 20*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Type (7)           |             Length            |
+-+-+-+-+-+-+-+-+-+-+-+-+-+-+-+-+-+-+-+-+-+-+-+-+-+-+-+-+-+-+-+-+
|                       IPv6 Remote ASBR ID                     |
+-+-+-+-+-+-+-+-+-+-+-+-+-+-+-+-+-+-+-+-+-+-+-+-+-+-+-+-+-+-+-+-+
```

*FIG. 21*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Type (8)           |             Length            |
+-+-+-+-+-+-+-+-+-+-+-+-+-+-+-+-+-+-+-+-+-+-+-+-+-+-+-+-+-+-+-+-+
|                   Local Interface IPv4 Address(es)            |
+-+-+-+-+-+-+-+-+-+-+-+-+-+-+-+-+-+-+-+-+-+-+-+-+-+-+-+-+-+-+-+-+
```

*FIG. 22*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Type (10)          |             Length            |
+-+-+-+-+-+-+-+-+-+-+-+-+-+-+-+-+-+-+-+-+-+-+-+-+-+-+-+-+-+-+-+-+
|                 Neighbor Interface IPv4 Address(es)           |
+-+-+-+-+-+-+-+-+-+-+-+-+-+-+-+-+-+-+-+-+-+-+-+-+-+-+-+-+-+-+-+-+
```

*FIG. 23*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                  Destination Node 1 IPv4 Address              |
+-+-+-+-+-+-+-+-+-+-+-+-+-+-+-+-+-+-+-+-+-+-+-+-+-+-+-+-+-+-+-+-+
|                                                               |
~                         . . . . . .                           ~
+-+-+-+-+-+-+-+-+-+-+-+-+-+-+-+-+-+-+-+-+-+-+-+-+-+-+-+-+-+-+-+-+
|                  Destination Node n IPv4 Address              |
+-+-+-+-+-+-+-+-+-+-+-+-+-+-+-+-+-+-+-+-+-+-+-+-+-+-+-+-+-+-+-+-+
```

*FIG. 27*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                  Segment End Node 1 IPv4 Address              |
+-+-+-+-+-+-+-+-+-+-+-+-+-+-+-+-+-+-+-+-+-+-+-+-+-+-+-+-+-+-+-+-+
|                                                               |
~                         . . . . . .                           ~
+-+-+-+-+-+-+-+-+-+-+-+-+-+-+-+-+-+-+-+-+-+-+-+-+-+-+-+-+-+-+-+-+
|                  Segment End Node n IPv4 Address              |
+-+-+-+-+-+-+-+-+-+-+-+-+-+-+-+-+-+-+-+-+-+-+-+-+-+-+-+-+-+-+-+-+
```

*FIG. 28*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                   Exception Node 1 IPv4 Address               |
+-+-+-+-+-+-+-+-+-+-+-+-+-+-+-+-+-+-+-+-+-+-+-+-+-+-+-+-+-+-+-+-+
|                                                               |
~                         . . . . . .                           ~
+-+-+-+-+-+-+-+-+-+-+-+-+-+-+-+-+-+-+-+-+-+-+-+-+-+-+-+-+-+-+-+-+
|                   Exception  Node n IPv4 Address              |
+-+-+-+-+-+-+-+-+-+-+-+-+-+-+-+-+-+-+-+-+-+-+-+-+-+-+-+-+-+-+-+-+
```

*FIG. 29*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                Segment End Node 1 IGP Metric Value            |
+-+-+-+-+-+-+-+-+-+-+-+-+-+-+-+-+-+-+-+-+-+-+-+-+-+-+-+-+-+-+-+-+
|                                                               |
~                         . . . . . .                           ~
+-+-+-+-+-+-+-+-+-+-+-+-+-+-+-+-+-+-+-+-+-+-+-+-+-+-+-+-+-+-+-+-+
|                Segment End Node n IGP Metric Value            |
+-+-+-+-+-+-+-+-+-+-+-+-+-+-+-+-+-+-+-+-+-+-+-+-+-+-+-+-+-+-+-+-+
```

*FIG. 30*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                  Segment End Node 1 TE Metric Value            |
+-+-+-+-+-+-+-+-+-+-+-+-+-+-+-+-+-+-+-+-+-+-+-+-+-+-+-+-+-+-+-+-+
|                          . . . . . .                           |
~                                                                ~
+-+-+-+-+-+-+-+-+-+-+-+-+-+-+-+-+-+-+-+-+-+-+-+-+-+-+-+-+-+-+-+-+
|                  Segment End Node n TE Metric Value            |
+-+-+-+-+-+-+-+-+-+-+-+-+-+-+-+-+-+-+-+-+-+-+-+-+-+-+-+-+-+-+-+-+
```

*FIG. 31*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                 Segment End Node 1 Hop Counts Value            |
+-+-+-+-+-+-+-+-+-+-+-+-+-+-+-+-+-+-+-+-+-+-+-+-+-+-+-+-+-+-+-+-+
|                          . . . . . .                           |
~                                                                ~
+-+-+-+-+-+-+-+-+-+-+-+-+-+-+-+-+-+-+-+-+-+-+-+-+-+-+-+-+-+-+-+-+
|                 Segment End Node n Hop Counts Value            |
+-+-+-+-+-+-+-+-+-+-+-+-+-+-+-+-+-+-+-+-+-+-+-+-+-+-+-+-+-+-+-+-+
```

*FIG. 32*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                            Tunnel ID                           |
+-+-+-+-+-+-+-+-+-+-+-+-+-+-+-+-+-+-+-+-+-+-+-+-+-+-+-+-+-+-+-+-+
```

*FIG. 33*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                             Path ID                            |
+-+-+-+-+-+-+-+-+-+-+-+-+-+-+-+-+-+-+-+-+-+-+-+-+-+-+-+-+-+-+-+-+
```

*FIG. 34*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Status Code  |    Reason     |           Reserved             |
+-+-+-+-+-+-+-+-+-+-+-+-+-+-+-+-+-+-+-+-+-+-+-+-+-+-+-+-+-+-+-+-+
|                          Optional TLVs                         |
+-+-+-+-+-+-+-+-+-+-+-+-+-+-+-+-+-+-+-+-+-+-+-+-+-+-+-+-+-+-+-+-+
```

*FIG. 35*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                           (top label)                         |
+-+-+-+-+-+-+-+-+-+-+-+-+-+-+-+-+-+-+-+-+-+-+-+-+-+-+-+-+-+-+-+-+
```

*FIG. 36*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                         Interface Index                       |
+-+-+-+-+-+-+-+-+-+-+-+-+-+-+-+-+-+-+-+-+-+-+-+-+-+-+-+-+-+-+-+-+
```

*FIG. 37*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                      Interface IPv4 Address                   |
+-+-+-+-+-+-+-+-+-+-+-+-+-+-+-+-+-+-+-+-+-+-+-+-+-+-+-+-+-+-+-+-+
```

*FIG. 38*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Object-Class |   OT  |Res|P|I|       Object-Length (bytes)   |
+-+-+-+-+-+-+-+-+-+-+-+-+-+-+-+-+-+-+-+-+-+-+-+-+-+-+-+-+-+-+-+-+
|                                                               |
~                           Object Body                         ~
|                                                               |
+-+-+-+-+-+-+-+-+-+-+-+-+-+-+-+-+-+-+-+-+-+-+-+-+-+-+-+-+-+-+-+-+
```

*FIG. 39*

PATH COMPUTATION ELEMENT HIERARCHICAL SOFTWARE DEFINED NETWORK CONTROL

CROSS-REFERENCE TO RELATED APPLICATIONS

The present application claims priority to U.S. Provisional Patent Application No. 62/297,280 filed Feb. 19, 2016 by Huaimo Chen and entitled "Path Computation Element (PCE) Hierarchical Software Defined Network (SDN) Control Systems," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A Path Computation Element (PCE) is a network component, application, or node capable of computing sophisticated paths through a network by applying computational constraints in real time. Traditionally, network routes are calculated and managed off-line as part of a network's traffic engineering. In such a scenario, when a new customer comes online, the customer's traffic requirements are evaluated and superimposed on the current network's topology. The PCE architecture is defined by the Internet Engineering Task Force (IETF) Request for Comments (RFC) 4655 document titled, "A Path Computation Element (PCE)-Based Architecture," published in August 2006, which is incorporated herein by reference.

The PCE has a complete picture of the topology of the network at the precise moment derived from other Operational Support Software (OSS) programs. As such, the PCE is able to calculate in real time the optimal path through the network. The path is then used to automatically update router configurations and the traffic engineering database. The PCE receives and responds to path computation requests received from a Path Computation Client (PCC) using a Path Computation Element Communication Protocol (PCEP). The PCEP is defined by the IETF RFC 5440 document titled, "Path Computation Element (PCE) Communication Protocol (PCEP)," published in March 2009, which is incorporated herein.

SUMMARY

Network elements such as path computation element (PCE) controllers may not have a complete picture or topology of a domain when attempting to create a tunnel or path for routing data, such as when a first PCE controller controls another network device that itself is both a PCE child of the first PCE controller and a second PCE controller for other network devices, the first PCE controller may not have a complete picture of the topology of the network controlled by the child PCE. The inventive concepts disclosed herein solve the problem of the prior art by enabling implementation of a hierarchical software defined network (SDN) control system (HSCS) by PCE controllers.

In an embodiment the disclosure includes a parent PCE controller comprising a memory comprising instructions executable by a processor and a processor coupled to the memory and configured to execute the instructions. Executing the instructions causes the processor to establish a parent-child relationship with at least a first child PCE controller and a second child PCE controller, wherein the first child PCE controller controls a first domain, and wherein the second child PCE controller controls a second domain, receive a request to create an end-to-end (E2E) tunnel crossing the first domain and the second domain, wherein a source of the E2E tunnel is located in the first domain, and wherein a destination of the E2E tunnel is located in the second domain, compute a shortest path from the source to the destination through the first domain and the second domain, transmit a request message to the first child PCE controller for creating a first tunnel segment of the E2E tunnel through the first domain, and transmit a request message to the second child PCE controller for creating a second tunnel segment of the E2E tunnel through the second domain, wherein the first tunnel segment and the second tunnel segment together comprise the E2E tunnel.

In an embodiment, executing the instructions further causes the processor to transmit a first request for computing path segments to the first child PCE controller to cause the first child PCE controller to compute at least a first path segment from the source to a first edge node of the first domain, transmit a second request for computing path segments to the second child PCE controller to cause the second child PCE controller to compute at least a second path segment from a second edge node of the second domain to the destination, receive a first reply for computing path segments message from the first child PCE controller, wherein the first reply for computing path segments message identifies the first path segment to the parent PCE controller, receive a second reply for computing path segments message from the second child PCE controller, wherein the second reply for computing path segments message identifies the second path segment to the parent PCE controller, and compute the shortest path from the source to the destination through the first domain and the second domain according to the first path segment and the second path segment. In an embodiment, transmitting the request message to the first child PCE controller for creating the first tunnel segment of the E2E tunnel through the first domain comprises transmitting a Request for Creating Tunnel Segment message to the first child PCE controller, and wherein the Request for Creating Tunnel Segment message comprises a list of each node of the first domain through which the first tunnel segment should pass. In an embodiment, transmitting the request message to the first child PCE controller for creating the first tunnel segment of the E2E tunnel through the first domain comprises transmitting a Request for Creating Tunnel Segment message to the first child PCE controller, wherein the Request for Creating Tunnel Segment message comprises a start node of the first tunnel segment and an end node of the first tunnel segment, wherein the start node and the end node are nodes within the first domain, and wherein the start node and the end node identify a link that indicates to the first child PCE controller each node of the first domain from the start node to the end node through which the first tunnel segment should pass. In an embodiment, establishing the parent-child relationship with at least the first child PCE controller comprises transmitting an Open message to the first child PCE controller, wherein the Open message comprises a HSCS type-length-value (TLV), and wherein the HSCS TLV comprises a plurality of capability flags configured to convey HSCS capabilities of the parent PCE controller to the first child PCE controller. In an embodiment, the capability flags comprise a Parent Controller flag configured to indicate functionality as a parent PCE controller, a Child Controller flag configured to indicate functionality as a child PCE controller, a Path Segments flag configured to indicate support for computing path segments for HSCS, a Tunnel Segment flag configured to indicate support for creating tunnel segments for HSCS, and an E2E flag configured to indicate support for creating and maintaining an E2E label switched path (LSP) tunnel. In an embodiment, establishing the parent-child relationship with at least the first child PCE controller comprises transmitting a Discovery message to the first child PCE controller, and wherein the Discovery message comprises a local controller object configured to indicate an identity of a local PCE controller, and a remote controller object configured to indicate an identity of a remote PCE controller. In an embodiment, executing the instructions further causes the processor to transmit a request for removing path segments message to the first child PCE controller to cause the first child PCE controller to remove path segments computed and stored by the first child PCE controller, wherein the request for removing path segments message indicates one or more of the path segments computed and stored by the first child PCE controller, and receive a first reply for removing path segments message from the first child PCE controller, wherein the first reply for removing path segments message indicates a status of removal of the path segments identified in the request for removing path segments message. In an embodiment, executing the instructions further causes the processor to transmit a request for keeping path segments message to the first child PCE controller to cause the first child PCE controller to keep path segments computed and stored by the first child PCE controller, wherein the request for keeping path segments message indicates one or more of the path segments computed and stored by the first child PCE controller and which are included in the shortest path computed by the parent PCE controller, and receive a first reply for keeping path segments message from the first child PCE controller, wherein the first reply for keeping path segments message indicates a status of keeping the path segments identified in the request for keeping path segments message. In an embodiment, executing the instructions further causes the processor to transmit a request for removing tunnel segment message to the first child PCE controller to cause the first child PCE controller to remove the first tunnel segment, and receive a first reply for removing tunnel segment message from the first child PCE controller, wherein the first reply for removing tunnel segment message indicates a status of removal of the first tunnel segment identified in the request for removing tunnel segment message. In an embodiment, the parent PCE controller is a child PCE controller of an upper level PCE controller.

In an embodiment, the disclosure includes a child path computation element controller configured to control a first domain comprising a memory comprising instructions executable by a processor, and a processor coupled to the memory and configured to execute the instructions. Executing the instructions causes the processor to establish a child-parent relationship with a parent PCE controller, transmit an advertisement message to the parent PCE controller, wherein the advertisement message indicates connections and accesses of the first domain, receive a request message from the parent PCE controller for creating a tunnel segment of an E2E tunnel through the first domain, wherein the request message indicates at least a start node and an end node for the tunnel segment, and wherein the start node and the end node are located within the first domain, create the tunnel segment according to the request message, and transmit a reply message to the parent PCE controller, wherein the reply message indicates a status of creation of the tunnel segment. In an embodiment, executing the instructions further causes the processor to receive a request for computing path segments for use in creating the E2E tunnel, wherein each path segment connects one edge node of the first domain to another edge node of the first domain, and wherein the request for computing path segments includes a global tunnel identification (GTID) and a path identification (PID), compute the path segments according to the request for computing path segments, store details of the computed path segments along with an association to the GTID and the PID, and transmit a reply for computing path segments message to the parent PCE controller, wherein the path segment reply message comprises a plurality of links and a plurality of costs, wherein each of the plurality of links is associated with a corresponding cost in the plurality of costs, wherein each of the plurality of links comprises a start node and an end node of a computed path segment, and wherein each of the plurality of costs indicates a computational cost of traversing the link with which the cost is associated. In an embodiment, creating the tunnel segment according to the request message comprises assigning labels along a path received from the parent PCE controller in the request message, and writing cross connects between nodes along the path received from the parent PCE controller in the request message. In an embodiment, creating the tunnel segment according to the request message comprises determining a computed path segment corresponding to a link received from the parent PCE controller in the request message, assigning labels along the computed path segment, and writing cross connects between nodes along the computed path segment. In an embodiment, establishing the child-parent relationship with the parent PCE controller comprises transmitting an Open message to the parent PCE controller, wherein the Open message comprises a HSCS TLV, and wherein the HSCS TLV comprises a plurality of capability flags configured to convey HSCS capabilities of the child PCE controller to the parent PCE controller. In an embodiment, the capability flags comprise a Parent Controller flag configured to indicate functionality as the parent PCE controller, a Child Controller flag configured to indicate functionality as the child PCE controller, a Path Segments flag configured to indicate support for computing path segments for HSCS, a Tunnel Segment flag configured to indicate support for creating tunnel segments for HSCS, and an E2E flag configured to indicate support for creating and maintaining an E2E LSP tunnel. In an embodiment, establishing the child-parent relationship with the parent PCE controller comprises transmitting a Discovery message to the parent PCE controller, and wherein the Discovery message comprises a local controller object configured to indicate an identity of a local PCE controller, and a remote controller object configured to indicate an identity of a remote PCE controller. In an embodiment, executing the instructions further causes the processor to receive a request for removing path segments message from the parent PCE controller, remove path segments computed and stored by the child PCE controller when the path segments are identified in the request for removing path segments message, and transmit a reply for removing path segments message to the parent PCE controller, wherein the reply for removing path segments message indicates a status of removal of the path segments identified in the request for removing path segments message. In an embodiment, executing the instructions further causes the processor to receive a request for keeping path segments message from the parent PCE controller, keep path segments computed and stored by the child PCE controller when the path segments are identified in the request for keeping path segments message, remove path segments computed and stored by the child PCE controller when the path segments are not identified in the request for keeping path segments message, and transmit a reply for keeping path segments message to the parent PCE controller, wherein the reply for keeping path segments message indicates a status of keeping the path segments identified in the request for keeping path segments message. In an embodiment, executing the instructions further causes the processor to receive a request for removing tunnel segment message from the parent PCE controller, remove the tunnel segment when the tunnel segment is identified in the request for removing tunnel segment message, and transmit a reply for removing tunnel segment message to the parent PCE controller, wherein the reply for removing tunnel segment message indicates a status of removal of the tunnel segment when the tunnel segment is identified in the request for removing tunnel segment message. In an embodiment, the child PCE controller is the parent PCE controller of a lower level child PCE controller.

In an embodiment, the disclosure includes a method for performing parent-child discovery comprising transmitting, by a parent PCE controller, a first message to a child PCE controller, wherein the first message identifies the parent PCE controller to the child PCE controller, and receiving, by the parent PCE controller, a second message from the child PCE controller, wherein the second message identifies the child PCE controller to the parent PCE controller.

In an embodiment, the first message and the second message are each Open messages, wherein the Open messages each comprises a HSCS TLV, and wherein the HSCS TLV comprises a plurality of capability flags configured to convey support for HSCS capabilities. In an embodiment, the capability flags comprise a Parent Controller flag configured to indicate functionality as the parent PCE controller, a Child Controller flag configured to indicate functionality as the child PCE controller, a Path Segments flag configured to indicate support for computing path segments for HSCS, a Tunnel Segment flag configured to indicate support for creating tunnel segments for HSCS, and an E2E flag configured to indicate support for creating and maintaining an E2E LSP tunnel. In an embodiment, the first message and the second message are each Discovery messages, and wherein each Discovery message comprises a local controller object configured to indicate an identity of a local PCE controller, and a remote controller object configured to indicate an identity of a remote PCE controller.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 1 is an embodiment of a schematic diagram of a Path Computation Element (PCE) architecture.

FIG. 2 is an embodiment of a hierarchical software defined network (SDN) control system (HSCS) Capability Type-Length-Value (TLV) for use in advertising capabilities for HSCS.

FIG. 3 is an embodiment of a protocol diagram of communication between PCEP network elements performing parent-child discovery according to the HSCS Capability TLV.

FIG. 15 is an embodiment of an Inter-Domain Link Type Sub-TLV for use in an Inter-Domain Link TLV.

FIG. 16 is an embodiment of an autonomous system (AS) Number Sub-TLV for use in an Inter-Domain Link TLV.

FIG. 17 is an embodiment of an Area-ID Sub-TLV for use in an Inter-Domain Link TLV.

FIG. 18 is an embodiment of an OSPF Router-ID Sub-TLV for use in an Inter-Domain Link TLV.

FIG. 19 is an embodiment of an ISIS Router-ID Sub-TLV for use in an Inter-Domain Link TLV.

FIG. 20 is an embodiment of an IPv4 Remote autonomous system boundary router (ASBR) ID Sub-TLV for use in an Inter-Domain Link TLV.

FIG. 21 is an embodiment of an IPv6 Remote ASBR ID Sub-TLV for use in an Inter-Domain Link TLV.

FIG. 22 is an embodiment of a Local Interface IPv4 Address Sub-TLV for use in an Inter-Domain Link TLV.

FIG. 23 is an embodiment of a Remote Interface IPv4 Address Sub-TLV for use in an Inter-Domain Link TLV.

FIG. 27 is an embodiment of a Destination-Node-List object for use in messages according to various embodiments of the present disclosure.

FIG. 28 is an embodiment of a Segment-End-Node-List object for use in messages according to various embodiments of the present disclosure.

FIG. 29 is an embodiment of an Exception-Node-List object for use in messages according to various embodiments of the present disclosure.

FIG. 30 is an embodiment of a Node-interior gateway protocol (IGP)-Metric-List object for use in messages according to various embodiments of the present disclosure.

FIG. 31 is an embodiment of a Node-TE-Metric-List object for use in messages according to various embodiments of the present disclosure.

FIG. 32 is an embodiment of a Node-Hop-Count-List object for use in messages according to various embodiments of the present disclosure.

FIG. 33 is an embodiment of a Tunnel-identification (ID) object for use in messages according to various embodiments of the present disclosure.

FIG. 34 is an embodiment of a Tunnel-Path-ID object for use in messages according to various embodiments of the present disclosure.

FIG. 35 is an embodiment of a Status object for use in messages according to various embodiments of the present disclosure.

FIG. 36 is an embodiment of a top label object for use in messages according to various embodiments of the present disclosure.

FIG. 37 is an embodiment of an Interface Index object for use in messages according to various embodiments of the present disclosure.

FIG. 38 is an embodiment of an Interface IPv4 Address object for use in messages according to various embodiments of the present disclosure.

FIG. 39 is an embodiment of an object header for use in messages according to various embodiments of the present disclosure.

DETAILED DESCRIPTION

Figure 4:
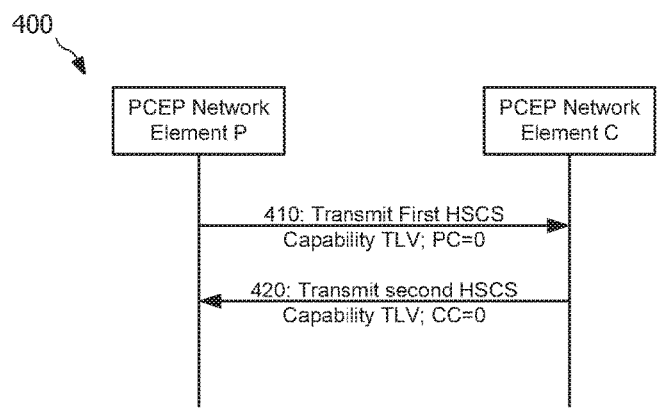
FIG. 4 is an embodiment of a protocol diagram of communication between PCEP network elements performing parent-child maintenance according to the HSCS Capability TLV.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are embodiments that provide for a Path Computation Element (PCE) hierarchical software defined network (SDN) control system (HSCS). The disclosed embodiments include enable first parent PCE controller to control a child PCE controller, which itself functions as a second parent PCE controller to control one or more child PCE controllers. The disclosed embodiments may provide one or more Path Computation Element Communication Protocol (PCEP) extensions to achieve the above, as well as to enable coordination between a plurality of PCE controllers, central control of a network having multiple domains each controlled by a separate child PCE controller, and/or enable a parent PCE controller and a child PCE controller to individually maintain and manage at least some network resources such as bandwidth, labels, etc. The PCEP extensions may further enable PCE controllers to declare their respective capabilities for supporting a HSCS, enable discovery of relations between parent PCE controllers and child PCE controllers, enable transmission of connection and accesses advertisement from child PCE controllers to parent PCE controllers, and enable a parent PCE controller with, or without, a knowledge of a topology of a domain of a child PCE controller to create, change, or remove an end-to end (E2E) tunnel routed through the domains controlled by the child PCE controllers. The various embodiments of the present disclosure may be further described and understood according to the Internet Engineering Task Force (IETF) Internet-Draft document titled "PCE Hierarchical SDNs draft-chen-pce-h-sdns-01," published in October 2016, which is incorporated herein by reference.

Referring to FIG. 1, a schematic diagram of an embodiment of a PCE architecture 100 that may be suitable for creating an E2E path through multiple domains 104 is shown. As shown in FIG. 1, the PCE architecture 100 includes a parent PCE controller 106, a plurality of child PCE controllers 108, optionally a second level parent PCE controller 110 and second level child PCE controllers 112, and a plurality of nodes 114 disposed throughout the domains 104. The E2E path may extend from one node 114 (e.g., a source) to another node 114 (e.g., a destination). The parent PCE controllers 106, child PCE controllers 108, second level parent PCE controller 110, and second level child PCE controllers 112 may generally be referred to as PCEP network elements, which may be defined as any network element that is capable of communicating according to PCEP.

The parent PCE controller 106 creates a parent-child relationship with the child PCE controllers 108. When the PCE architecture 100 includes the second level parent PCE controller 110, the second level parent PCE controller 110 is a child PCE controller of the parent PCE controller 106 (e.g., equivalent to a child PCE controller 108 as viewed from the parent PCE controller 106) and is also a parent PCE controller to the second level child PCE controllers 112. For the following discussion of the parent PCE controller 106 communicating with the child PCE controller 108, the second level parent PCE controller 110 may be considered as a child PCE controller 108. Additionally, any communications transmitted or received by the parent PCE controller 106 with respect to the child PCE controller 108 and the second level parent PCE controller 110 may also be applicable to the second level parent PCE controller in communicating with the second level child PCE controllers 112.

The parent PCE controller 106 transmits one or more requests, and receives one or more replies from the child PCE controllers 108 to establish the parent-child relationship. For example, the messages include an Open message and/or a Discovery message, as discussed in greater detail below. The parent PCE controller 106 further requests, in some embodiments, the child PCE controllers 108 to compute path segments for use in the E2E path, where the E2E path is computed by the parent PCE controller 106. The parent PCE controller 106 further requests, in some embodiments, the child PCE controllers 108 to create tunnel segments corresponding to the computed path segments to create an E2E tunnel suitable for communicating across multiple domains 104. It should be recognized that the PCE architecture 100 is merely an overview and the PCE architecture 100 may include other network elements or components and may have other suitable configurations in practical applications as would be appreciated by one skilled in the art upon reviewing this disclosure in its entirety.

Referring to FIG. 2, an embodiment of a HSCS Capability Type-Length-Value (TLV) for use in advertising capabilities for HSCS is shown. The HSCS Capability TLV is implemented in a message transmitted between two PCEP network elements (e.g., between the parent PCE controller 106 and any one or more of the child PCE controllers 108, any other parent PCE controller and a child PCE controller, or any two or more network elements capable of communicating according to PCEP and seeking to declare their capabilities. The message is transmitted, in some embodiments, during establishment of a PCEP session between the two PCEP network elements. The message may be, for example, an Open Message sent between the two PCEP network elements to establish the PCEP session and the HSCS Capability TLV is included, for example, within an Optional TLV field of an Open Object of the Open Message.

As shown in FIG. 2, the HSCS Capability TLV includes a Type field, a Length field, a Capability Flags field, and an Optional Sub-TLVs field. The Type field is an identifier of the HSCS Capability TLV that indicates a type of the HSCS Capability TLV. The type of the HSCS Capability TLV, and therefore the identifier, may be a numeric value that is assigned to the HSCS Capability TLV at a later time and a particular value of the Type field of the HSCS Capability TLV is not limited herein. The Length field indicates a length of the Capability Flags field and the Optional Sub-TLVs field. For example, the Length field may indicate a length of four octets (which may also be referred to as bytes, which each may contain eight bits) for the Capability Flags field, plus a length of the Optional Sub-TLVs field. The length of the Optional Sub-TLVs field is dependent upon which, if any, Optional Sub-TLVs are included in the HSCS Capability TLV, and therefore a particular value of the Length field of the HSCS Capability TLV is not limited herein.

The Capability Flags field comprises the value of the HSCS Capability TLV and indicates a capability of a PCEP network element that transmits the HSCS Capability TLV. In some embodiments, the Capability Flags field is a 32-bit binary field, as discussed above. A most significant bit of the Capability Flags field may be identified as a bit 0 and each bit to the right of bit 0 may be identified by incrementing an identity of the last preceding bit to the left such that the Capability Flags field contains bits 0 to 31 as identified in a direction of most significant bit to least significant bit. Individual capabilities of the PCEP network element that transmits the HSCS Capability TLV are each represented by a single bit.

In some embodiments, bit 0 is a Parent Controller bit that indicates whether the PCEP network element that transmits the HSCS Capability TLV is a parent PCE controller. For example, when the PCEP network element that transmits the HSCS Capability TLV is a parent PCE controller, bit 0 is set to "1" to indicate parent PCE controller capabilities. Conversely, when the PCEP network element that transmits the HSCS Capability TLV is not a parent PCE controller, bit 0 is set to "0" to indicate no parent PCE controller capabilities.

In some embodiments, bit 1 is a Child Controller bit that indicates whether the PCEP network element that transmits the HSCS Capability TLV is a child PCE controller. For example, when the PCEP network element that transmits the HSCS Capability TLV is a child PCE controller, bit 1 is set to "1" to indicate child PCE controller capabilities. Conversely, when the PCEP network element that transmits the HSCS Capability TLV is not a child PCE controller, bit 1 is set to "0" to indicate no child PCE controller capabilities.

In some embodiments, bit 2 is a Path Segments bit that indicates whether the PCEP network element that transmits the HSCS Capability TLV is capable of computing path segments for HSCS. For example, when the PCEP network element that transmits the HSCS Capability TLV is capable of computing path segments for HSCS, bit 2 is set to "1" to indicate the path segment computation capabilities. Conversely, when the PCEP network element that transmits the HSCS Capability TLV is not capable of computing path segments for HSCS, bit 2 is set to "0" to indicate no path segment computation capabilities.

In some embodiments, bit 3 is a Tunnel Segment bit that indicates whether the PCEP network element that transmits the HSCS Capability TLV is capable of creating tunnel segments for HSCS. For example, when the PCEP network element that transmits the HSCS Capability TLV is capable of creating tunnel segments for HSCS, bit 3 is set to "1" to indicate tunnel segment creation capabilities. Conversely, when the PCEP network element that transmits the HSCS Capability TLV is not capable of creating tunnel segments for HSCS, bit 3 is set to "0" to indicate no tunnel segment creation capabilities.

In some embodiments, bit 4 is an E2E Tunnel bit that indicates whether the PCEP network element that transmits the HSCS Capability TLV is capable of creating and maintaining E2E label switched path (LSP) tunnels. For example, when the PCEP network element that transmits the HSCS Capability TLV is capable of creating and maintaining E2E LSP tunnels, bit 4 is set to "1" to indicate the E2E LSP tunnel capabilities. Conversely, when the PCEP network element that transmits the HSCS Capability TLV is not capable of creating and maintaining E2E LSP tunnels, bit 4 is set to "0" to indicate no E2E LSP tunnel capabilities.

Referring to FIG. 3, an embodiment of a protocol diagram 300 of communication between PCEP network elements P (e.g., the parent PCE controller 106) and C (e.g., any one of the child PCE controllers 108) performing parent-child discovery according to the HSCS Capability TLV is shown. At step 310, a PCEP network element P seeking to establish a parent-child relationship as a parent PCE controller with a PCEP network element C transmits a first HSCS Capability TLV (e.g., a first HSCS TLV as shown and described in FIG. 2) to the PCEP network element C. The first HSCS Capability TLV contains a Parent Controller bit set to "1, " as discussed above. The first HSCS Capability TLV indicates to the PCEP network element C that the PCEP network element P is a parent PCE controller. The PCEP network element P may receive an instruction from a user (e.g., a network administrator) instructing the PCEP network element P to configure the PCEP network element C as a child PCE controller for a parent-child relationship between the PCEP network element P and the PCEP network element C, and in response may transmit the first HSCS Capability TLV to the PCEP network element C.

The PCEP network element C receives the first HSCS Capability TLV from the PCEP network element P and, based on the first HSCS Capability TLV, determine that the PCEP network element P is a parent PCE controller. The PCEP network element C may receive an instruction from a user (e.g., a network administrator, which may be the same user as the user instructing the PCEP network element P or may be a different user) instructing the PCEP network element C to configure the PCEP network element P as a parent PCE controller for a parent-child relationship between the PCEP network element C and the PCEP network element P and form a child-parent relationship with the PCEP network element P based on the configuration and the first HSCS Capability TLV. In response to the configuration, the PCEP network element C may transmit a second HSCS Capability TLV to the PCEP network element P. The PCEP network element C transmits the second HSCS Capability TLV (e.g., a second HSCS TLV as shown and described in FIG. 2) to the PCEP network element P at step 320. The second HSCS Capability TLV contains a Child Controller bit set to "1," as discussed above. The second HSCS Capability TLV indicates to the PCEP network element P that the PCEP network element C is a child PCE controller. Upon receipt of the second HSCS Capability TLV, the PCEP network element P may, based on the second HSCS Capability TLV, determine that the PCEP network element C is a child PCE controller and form a parent-child relationship with the PCEP network element C with the PCEP network element P established as the parent PCE controller in the relationship and PCEP network element C established as the child PCE controller in the relationship, thereby completing PCE parent-child discovery between the PCEP network element P and the PCEP network element C.

Referring to FIG. 4, an embodiment of a protocol diagram 400 of communication between PCEP network elements P (e.g., the parent PCE controller 106) and C (e.g., one of the child PCE controllers 108) performing parent-child maintenance according to the HSCS Capability TLV is shown. After a pair of PCEP network elements form a parent-child relationship, one, or both, of the PCEP network elements may perform maintenance related to the parent-child relationship. For example, either of the PCEP network elements may break the parent-child relationship by transmitting a message, such as the Open Message discussed above, containing a flag that breaks or removes the relationship between the PCEP network elements. The PCEP network element P, discussed above, may receive an instruction from the user instructing the PCEP network element P to delete the PCEP network element C as the child PCE controller in the parent-child relationship between the PCEP network element P and the PCEP network element C. In response, at step 410, the PCEP network element P transmits a first HSCS Capability TLV (e.g., a first HSCS TLV as shown and described in FIG. 2) to the PCEP network element C that indicates the PCEP network element P is no longer a parent PCE controller to the PCEP network element C. The PCEP network element P indicates that the PCEP network element P is no longer a parent PCE controller to the PCEP network element C, for example, by including a Parent Controller bit set to "0" within the first HSCS Capability TLV.

The PCEP network element C receives the first HSCS Capability TLV and, based on the first HSCS Capability TLV, the PCEP network element C determines that the PCEP network element P is no longer its parent PCE controller and breaks or removes the child-parent relationship between the PCEP network element C and the PCEP network element P. The PCEP network element C subsequently transmits, at step 420, a message containing a second HSCS Capability TLV (e.g., a second HSCS TLV as shown and described in FIG. 2) to the PCEP network element P that indicates that the PCEP network element C is no longer a child PCE network controller of the PCEP network element P. The PCEP network element C indicates that the PCEP network element C is no longer a child PCE controller of the PCEP network element P, for example, by including a Child Controller bit set to "0" within the second HSCS Capability TLV. Upon receipt of the second HSCS Capability TLV, the PCEP network element P may, based on the second HSCS Capability TLV, determine that the PCEP network element C is no longer a child PCE controller and break or remove the parent-child relationship with the PCEP network element C.

Figure 5:
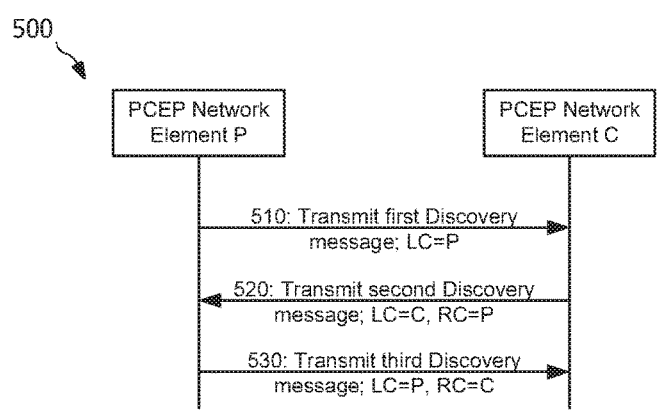
FIG. 5 is an embodiment of a protocol diagram of communication between PCEP network elements performing parent-child discovery according to a Discovery message.

Referring to FIG. 5, an embodiment of a protocol diagram 500 of communication between PCEP network elements P (e.g., the parent PCE controller 106) and C (e.g., any one of the child PCE controllers 108) performing parent-child discovery according to a Discovery message is shown. The Discovery message is discussed in greater detail below. In some embodiments, a Discovery message is transmitted between two PCEP network elements, for example, from a local PCEP network element or PCE controller to a remote PCEP network element or PCE controller to, for example, perform controller relation discovery. The controller relation discovery enables the PCEP network elements to determine which, if either, of the PCEP network elements is a parent PCE network controller and which, if either, of the PCEP network elements is a child PCE network controller.

At step 510, PCEP network element P transmits a first Discovery message to PCEP network element C containing a local controller object having a parent flag set to "1." The local controller object is discussed in greater detail below. The PCEP network element P transmits the first Discovery message, in some embodiments, after the PCEP network element C is configured as a child PCE controller over a PCEP session between the PCEP network elements P and C, while in other embodiments the PCEP network element P transmits the first Discovery message prior to the PCEP network element C being configured as a child PCE controller.

When the PCEP network element C receives the first Discovery message, the PCEP network element C determines that the PCEP network element P indicated as a parent PCE controller by the parent flag of the local controller object in the first Discovery message matches an identity of a parent PCE controller that is locally configured on the PCEP network element C. In response to the determination, at step 520 the PCEP network element C transmits a second Discovery message containing a local controller object having a child flag set to "1" and a remote controller object having a parent flag set to "1." The remote controller object is discussed in greater detail below.

When the PCEP network element P receives the second Discovery message, the PCEP network element P determines that the PCEP network element C indicated as a child PCE controller by the child flag of the local controller object in the second Discovery message matches an identity of a child PCE controller that is locally configured on the PCEP network element P. The PCEP network element P further determines that the PCEP network element C sees and acknowledges the PCEP network element P according to the parent flag of the remote controller object in the second Discovery message. After determining that the PCEP network element C matches the identity of the child PCE controller that is locally configured and that the PCEP network element C sees the PCEP network element P, the PCEP network element P forms a parent-child relationship between the PCEP network element P and the PCEP network element C and, at step 530, transmits a third Discovery message to the PCEP network element C. The third Discovery message contains a local controller object having a parent flag set to "1" and a remote controller object having a child flag set to "1."

When the PCEP network element C receives the third Discovery message, the PCEP network element C determines that the PCEP network element P indicated as a parent PCE controller by the parent flag of the local controller object in the third Discovery message matches an identity of a parent PCE controller that is locally configured on the PCEP network element C. The PCEP network element C further determines that the PCEP network element P sees and acknowledges the PCEP network element C according to the child flag of the remote controller object in the third Discovery message. After determining that the PCEP network element P matches the identity of the parent PCE controller that is locally configured and that the PCEP network element P sees the PCEP network element C, the PCEP network element C forms a child-parent relationship between the PCEP network element C and the PCEP network element P.

The Discovery message is a message that facilitates, in some embodiments, controller relation discovery (CRDis) between PCEP network elements and is sent from a local controller among the PCEP network elements to a remote controller among the PCEP network elements. The Discovery message includes a common header, a CRP object for supporting HSCS, a local controller object containing local controller attributes, and a remote controller object containing remote controller attributes after a local controller receives the remote controller attributes from a remote controller and determines that a relationship (e.g., parent-child and/or child-parent) can be formed between the PCEP network elements. In some embodiments, a format of the Discovery message is as shown below in Table 1.

TABLE 1

| <CRDis Message> ::= | <Common Header> |
| --- | --- |
| | <CRP> |
| | <Local-Controller> |
| | [<Remote-Controller>] |

Figure 6:
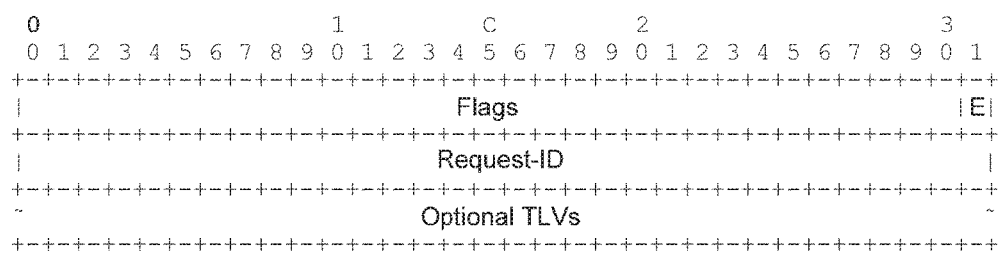
FIG. 6 is an embodiment of a controller request parameters (CRP) object for use in a Discovery message.

Referring to FIG. 6, an embodiment of a CRP object for use in a Discovery message is shown. The CRP object is implemented in a Discovery message transmitted between two PCEP network elements to enable support for HSCS. The message is transmitted, in some embodiments, during CRDis between two PCEP network elements. For example, the CRP object is transmitted during parent-child discovery between the parent PCE controller 106 and any one or more of the child PCE controllers 108 as shown and described in FIG. 1. The CRP object, in some embodiments, is defined by an object class and an object type. Each of the object class and the object type may be numeric values that are assigned to the CRP object at a later time, and a particular value of the object class and object type of the CRP object is not limited herein.

As shown in FIG. 6, the CRP object includes a Flags field, a Request-ID field, and an Optional TLVs field. The Flags field, in some embodiments, is a 32-bit binary field that contains one or more flags for indicating desired functionality or capability to a PCEP network element transmitting and/or receiving the CRP object. The Flags field comprises an Edges of Domain flag which may be set to "1" to indicate computing of a shortest path segment satisfying a given set of constraints form a start node to each edge node of a domain controlled by a child PCE controller except for nodes of the domain that are in a given exception list. The Flags field, in some embodiments, further comprises an Options field. The Options field, in some embodiments, is a 3-bit field, while in other embodiments the Options field is greater than, or less than, 3 bits. The Options field indicates to a PCEP network element receiving the CRP object that a request or reply associated with the CRP object is of a particular type. For example, when the Options field contains 001 (e.g., "1"), the request or reply associated with the CRP object is a path segment computation request or reply. When the Options field contains 010 (e.g., "2"), the request or reply associated with the CRP object is a remove path segment request or reply. When the Options field contains 011 (e.g., "3"), the request or reply associated with the CRP object is a keep path segment request or reply. When the Options field contains 100 (e.g., "4"), the request or reply associated with the CRP object is a create tunnel segment request or reply. When the Options field contains 101 (e.g., "5"), the request or reply associated with the CRP object is a remove tunnel segment request or reply.

Figure 7:
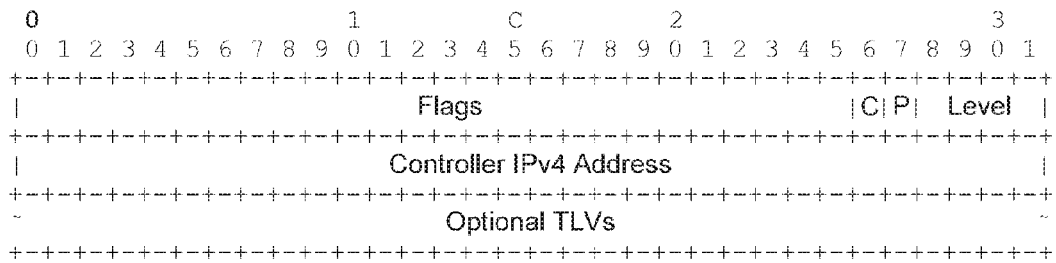
FIG. 7 is an embodiment of a local controller object for use in a Discovery message.

Referring to FIG. 7, an embodiment of a local controller object for use in a Discovery message is shown. For example, the local controller object is included in the CRDis message of FIG. 6 and transmitted between a parent PCE controller 106 and one or more child PCE controller 108. It should be noted that, in some embodiments, a remote controller object, as discussed above, has a structure and contents substantially similar to the local controller object. As such, for the following discussion of the local controller object, each detail may be considered as also describing the remote controller object unless otherwise stated, and details for each controller object are not repeated herein. The local controller object may be configured for use as an Internet Protocol version 4 (IPv4) object. In some embodiments, the local controller object includes a Flags field, a Controller IPv4 Address field, and an Optional TLVs field. The Flags field and the Controller IPv4 Address field may each be 32-bit binary fields. The local controller object is included, in some embodiments, in a Discovery message, as discussed above. The local controller object, in some embodiments, is defined by an object class and an object type. Each of the object class and the object type may be numeric values that are assigned to the local controller object at a later time, and a particular value of the object class and/or the object type of the local controller object is not limited herein.

The Controller IPv4 Address field, in some embodiments, indicates an IPv4 address of the local controller (e.g., the PCEP network element transmitting the local controller object). The Flags field, in some embodiments, comprises a Parent Controller flag (e.g., a first 1-bit field) and Child Controller flag (e.g., a second 1-bit field). The Parent Controller flag is set to "1" to indicate that a PCEP network element that is transmitting the local controller object is a parent PCE controller and is set to "0" to indicate that the PCEP network element that is transmitting the local controller object is not a parent PCE controller. The Child Controller flag is set to "1" to indicate that a PCEP network element that is transmitting the local controller object is a child PCE controller and is set to "0" to indicate that the PCEP network element that is transmitting the local controller object is not a child PCE controller. The Flags field, in some embodiments, further comprises a Level field. The Level field, in some embodiments, is a 4-bit field, while in other embodiments the Level field is greater than, or less than, 4 bits. The Level field indicates a level as a parent PCE controller of the PCEP network element transmitting the local controller object. For example, when the Parent Controller flag is set to "1" and the Level field contains a value of "0," the PCEP network element transmitting the local controller object is a top level parent PCE controller (e.g., the PCEP network element transmitting the local controller object is not controlled by any other parent PCE controller). When the Parent Controller flag is set to "1" and the Level field contains a value of i, where i>0, the PCEP network element transmitting the local controller object is a child PCE controller of a parent PCE controller having a level of i-1 and is a parent PCE controller for at least one child PCE controller. Bits in the 32-bit Flags field which are not assigned to the Parent Controller Flag or the Level field are reserved bits that are set to zero during transmission by a PCEP network element and ignored when received by a PCEP network element.

Returning now to FIG. 1, after a parent-child relationship is established between the parent PCE controller 106 and a child PCE controller 108, the respective child PCE controller transmits a Connections and Access Advertisement message (CAAdv message) to the parent PCE controller 106. The CAAdv message, in some embodiments, includes information (e.g., inter-domain links) relating to connections between a domain controlled by the respective child PCE controller and adjacent domains. The CAAdv message, in some embodiments, also includes accesses (e.g., addresses or prefixes for network elements (e.g., access points)) within the domain which may be accessible from outside the domain. The CAAdv message may be sent by the respective child PCE controller to the parent PCE controller 106 one time or more than one time (e.g., periodically and/or following a change to the connections and/or accesses of the domain). The parent PCE controller 106 receives CAAdv messages from each of its child PCE controllers 108 and stores the connection and accesses information for later use in routing data through a domain 104 controlled by one of the parent PCE controller 106's child PCE controllers in, for example, a data structure accessible by the parent PCE controller 106. When a respective child PCE controller 108 is non-functional, the parent PCE controller 106 optionally may remove the connection or access information corresponding to the respective child PCE controller 108 from the data structure.

The CAAdv message enables the parent PCE controller 106 to determine exterior information about the domains 104 controlled by the parent PCE controller 106's child controllers 108 and enables the parent PCE controller 106 to route data traffic through at least some of the domains 104. Furthermore, the exterior information about the domains 104 enables the parent PCE controller 106 to know connections between the domains 104, where each of the connections comprises attributes for a link connecting domains and attributes for end points of the link. The attributes for the end points of the link comprise a type of the end point (e.g., an area border router (ABR) or autonomous system boundary router (ASBR)) and a domain of the end point (e.g., an autonomous system (AS) number or an area number). In some embodiments, a format of the CAAdv message is as shown below in Table 2.

TABLE 2

| | | |
|---|---|---|
| <CAAdv Message> | ::= | <Common Header> <CRP> <Inter-Domain-Link-List> [<Access-Address-List>] |
| where: | | |
| <Inter-Domain-Link-List> | ::= | <Inter-Domain-Link> [<Inter-Domain-Link-List>] |
| <Access-Address-List> | ::= | <Access-Address> [<Access-Address-List>] |

Figure 8:
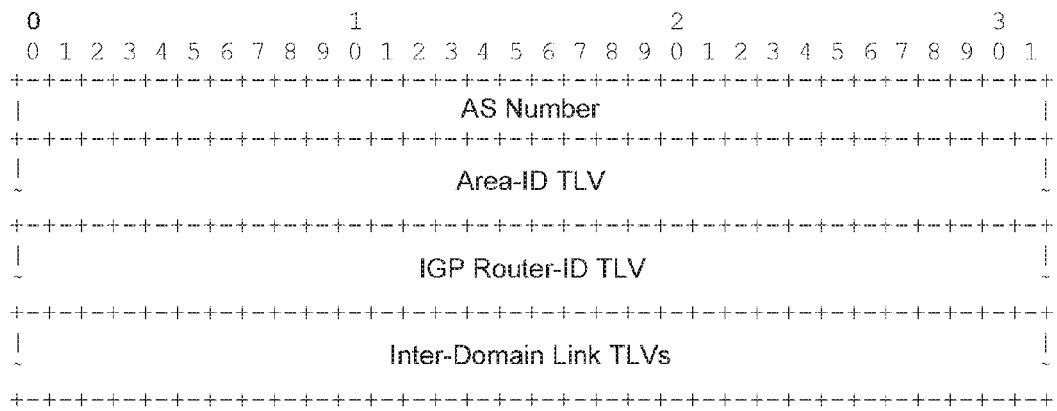
FIG. 8 is an embodiment of a connection and access object for use in communicating connection and access information.
Figure 9:
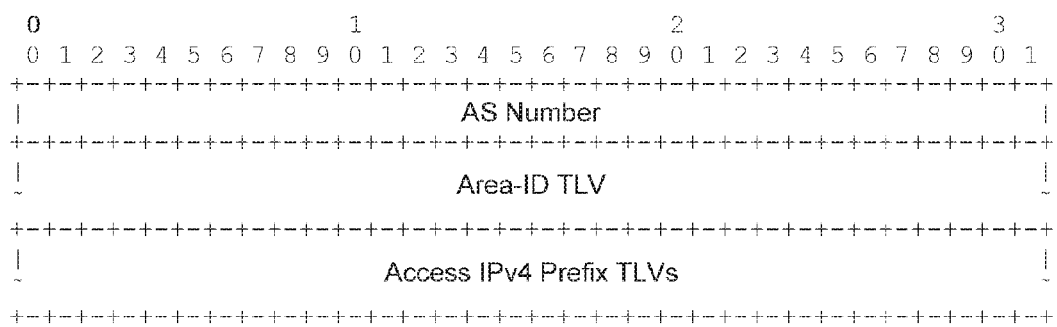
FIG. 9 is an embodiment of a connection and access object for use in communicating connection and access information.

Referring now to FIGS. 8 and 9, embodiments of a connection and access object for use in communicating connection and access information is shown. The connection and access object may be transmitted between PCEP network elements (e.g., one of the child PCE controllers 108 to the parent PCE controller 106) to relay information pertaining to connections and accesses of a domain controlled by one of the PCEP network elements (e.g., one of the child PCE controllers 108). For example, the connection and access object may be implemented as an object defining an Inter-Domain-Link or an Access-Address as discussed above. The connection and access object, in some embodiments, is defined by an object class and one or more object types (e.g., an Inter-Domain Link object type, an Access IPv4 object type and an Internet Protocol version 6 (IPv6) object type). Each of the object class and the object types may be numeric values that are assigned to the connection and access object at a later time, and particular values of the object class and/or the object types of the connection and access object are not limited herein.

As illustrated in FIG. 8, a connection and access object of the type Inter-Domain Link may include an AS Number field, an Area-ID TLV field, an interior gateway protocol (IGP) Router-ID TLV field, and/or an Inter-Domain Link TLVs field. The AS Number field, in some embodiments, is a 32-bit field that indicates an identity of a domain in which an end point of a connection associated with the connection and access object is located. The Inter-Domain Link TLVs field describes an inter-domain link and, in some embodiments, comprises one or more Inter-Domain Link Sub-TLVs. The Area-ID TLV field, the IGP Router-ID TLV field, and the Inter-Domain Link TLVs field are discussed in greater detail below.

As illustrated in FIG. 9, a connection and access object of the type Access IPv4 Prefix may include an AS Number field, an Area-ID TLV field, and/or an Access IPv4 Prefix TLVs field that may contain any number of Access IPv4 Prefix TLVs. The AS Number field may be as discussed above. The Area-ID TLV field and the Access IPv4 Prefix TLVs field are discussed in greater detail below. It should be noted that a connection and access object of the type Access IPv6 Prefix may be substantially similar to the connection and access object of the type Access IPv4 Prefix, with appropriate adjustments made to accommodate IPv6 characteristics as will be appreciated by one of ordinary skill in the art and details for which are not repeated herein.

Figure 10:
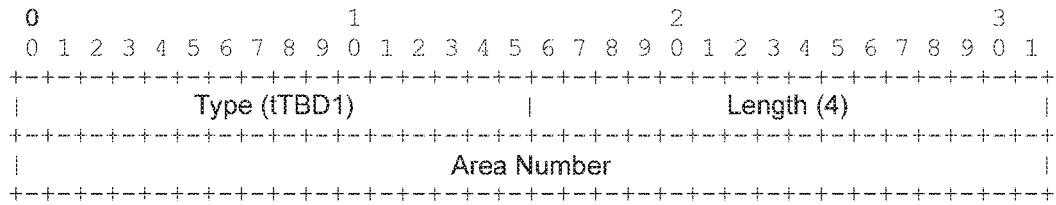
FIG. 10 is an embodiment of an Area-ID TLV for use in a connection and access object.

Referring now to FIG. 10, an embodiment of an Area-ID TLV suitable for implementation in the Area-ID TLV field of either, or both, of the connection and access object of the type Inter-Domain Link of FIG. 8 and/or the connection and access object of the type Access IPv4 Prefix of FIG. 9 is shown. The Area-ID TLV includes, in some embodiments, a Type field, a Length field, and an Area Number field. The Type field is an identifier of the Area-ID TLV. The type of the Area-ID TLV may be a numeric value that is assigned to the Area-ID TLV at a later time and a particular value of the Type field of the Area-ID TLV is not limited herein. The Length field indicates a length of the Area Number field. For example, the Length field may indicate a length of four octets for the Area Number field. The Area Number field includes an identification of an area or domain in which an end point of a connection associated with the connection and access object is located.

Figure 11:
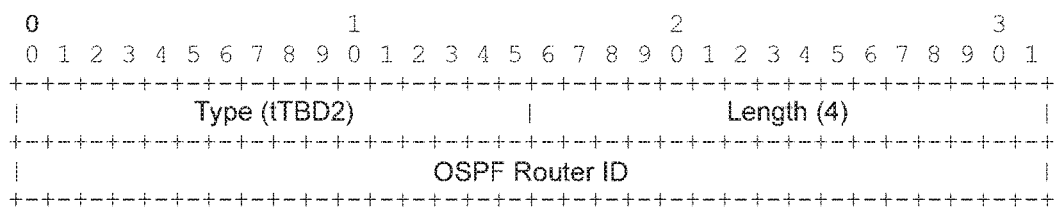
FIG. 11 is an embodiment of an open shortest path first (OSPF) Router-ID TLV for use in a connection and access object.

Referring now to FIG. 11, an embodiment of an open shortest path first (OSPF) Router-ID TLV suitable for implementation in the IGP Router-ID TLV field of the connection and access object of the type Inter-Domain Link of FIG. 8 is shown. The OSPF Router-ID TLV includes, in some embodiments, a Type field, a Length field, and an OSPF Router ID field. The Type field is an identifier of the OSPF Router-ID TLV. The type of the OSPF Router-ID TLV may be a numeric value that is assigned to the OSPF Router-ID TLV at a later time and a particular value of the Type field of the OSPF Router-ID TLV is not limited herein. The Length field indicates a length of the OSPF Router ID field. For example, the Length field may indicate a length of four octets for the OSPF Router ID field. The OSPF Router ID field includes an identification of a router capable of performing OSPF routing and which is associated with an end point of a connection associated with the connection and access object.

Figure 12:
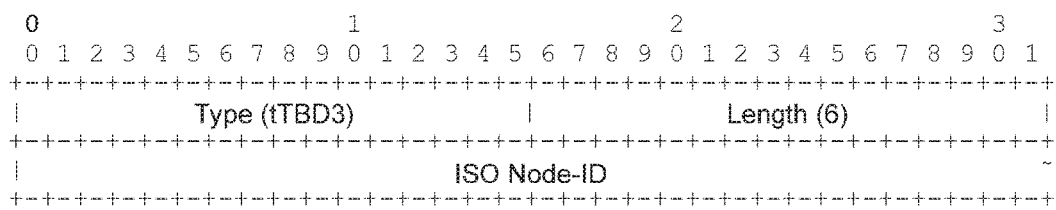
FIG. 12 is an embodiment of an intermediate system to intermediate system (ISIS) Router-ID TLV for use in a connection and access object.

Referring now to FIG. 12, an embodiment of an intermediate system to intermediate system (ISIS) Router-ID TLV suitable for implementation in the IGP Router-ID TLV field of the connection and access object of the type Inter-Domain Link of FIG. 8 is shown. It should be noted that only one of the OSPF Router-ID TLV of FIG. 9 or the ISIS Router-ID TLV of FIG. 10 is included in the IGP Router-ID TLV field of the connection and access object of the type Inter-Domain Link of FIG. 8 at any one time. The ISIS Router-ID TLV includes, in some embodiments, a Type field, a Length field, and an International Organization for Standardization (ISO) Node-ID field. The Type field is an identifier of the ISIS Router-ID TLV. The type of the ISIS Router-ID TLV may be a numeric value that is assigned to the ISIS Router-ID TLV at a later time and a particular value of the Type field of the ISIS Router-ID TLV is not limited herein. The Length field indicates a length of the ISO Node-ID field. For example, the Length field may indicate a length of six octets for the ISO Node-ID field. The ISO Node-ID field includes an identification of a node conforming to ISO standards which is capable of performing ISIS routing and which is associated with an end point of a connection associated with the connection and access object.

Figure 13:
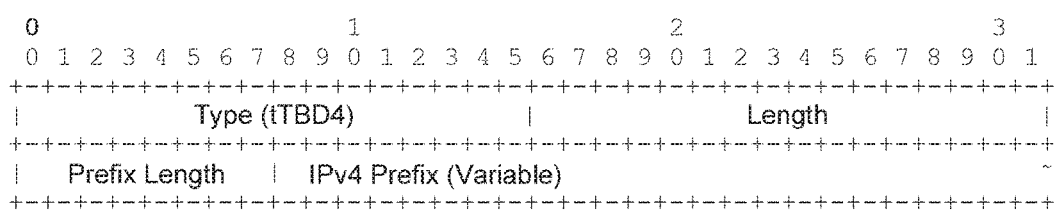
FIG. 13 is an embodiment of an Access IPv4 Prefix TLV for use in a connection and access object.

Referring now to FIG. 13, an embodiment of an Access IPv4 Prefix TLV suitable for implementation in the Access IPv4 Prefix TLVs field in the connection and access object of the Access IPv4 Prefix type of FIG. 9 is shown. The Access IPv4 Prefix TLV includes, in some embodiments, a Type field, a Length field, a Prefix Length field, and an IPv4 Prefix field. The Type field is an identifier of the Access IPv4 Prefix TLV. The type of the Access IPv4 Prefix TLV may be a numeric value that is assigned to the Access IPv4 Prefix TLV at a later time and a particular value of the Type field of the Access IPv4 Prefix TLV is not limited herein. The Length field indicates a length of the Prefix Length Field combined with the IPv4 Prefix field. For example, the Length field may indicate a length of four octets for the Prefix Length Field combined with the IPv4 Prefix field. The Prefix Length field indicates a length of the subsequent IPv4 Prefix in the IPv4 Prefix field. The IPv4 Prefix, in some embodiments, has a variable length, and as such, a particular value of the Prefix Length field is not limited herein. The IPv4 Prefix includes an identification of an access of a domain associated with a connection associated with the connection and access object (e.g., an access point or other network element within a domain controlled by a PCEP network element transmitting the connection and access object which is accessible outside of the domain).

Figure 14:
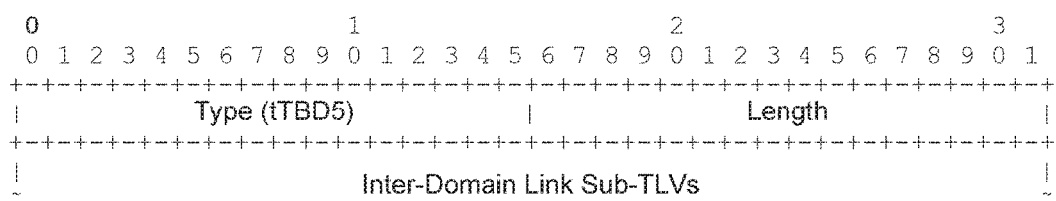
FIG. 14 is an embodiment of an Inter-Domain Link TLV for use in a connection and access object.

Referring now to FIG. 14, an embodiment of an Inter-Domain Link TLV suitable for implementation in the Inter-Domain Link TLVs field of the connection and access object of the type Inter-Domain Link of FIG. 8 is shown. The Inter-Domain Link TLV includes, in some embodiments, a Type field, a Length field, and an Inter-Domain Link Sub-TLVs field that may contain any number of Inter-Domain Link Sub-TLVs. The Type field is an identifier of the Inter-Domain Link TLV. The type of the Inter-Domain Link TLV may be a numeric value that is assigned to the Inter-Domain Link TLV at a later time and a particular value of the Type field of the Inter-Domain Link TLV is not limited herein. The Length field indicates a length of the Inter-Domain Link Sub-TLVs field. The Inter-Domain Link Sub-TLVs field includes one or more Inter-Domain Link Sub-TLVs which describe inter-domain links are discussed in greater detail below.

Referring now to FIG. 15, an embodiment of an Inter-Domain Link Type Sub-TLV suitable for implementation in the Inter-Domain Link Sub-TLVs field of the Inter-Domain Link TLV of FIG. 14 is shown. The Inter-Domain Link Type Sub-TLV includes, in some embodiments, a Type field, a Length field, and an Inter-Domain Link Type field. The Type field is an identifier of the Inter-Domain Link Type Sub-TLV. The type of the Inter-Domain Link Type Sub-TLV may be a numeric value that is assigned to the Inter-Domain Link Type Sub-TLV at a later time and a particular value of the Type field of the Inter-Domain Link Type Sub-TLV is not limited herein. The Length field indicates a length of the Inter-Domain Link Type field. For example, the Length field may indicate a length of four octets for the Inter-Domain Link Type field. The Inter-Domain Link Type field includes an identification of a type of Inter-Domain link associated with the connection and access object. In some embodiments, the type of Inter-Domain link identified in the Inter-Domain Link Type field is a point-to-point type (e.g., indicated as a type "1") or a multi-access type (e.g., indicated as a type "2").

Referring now to FIG. 16, an embodiment of a Remote AS Number Sub-TLV suitable for implementation in the Inter-Domain Link Sub-TLVs field of the Inter-Domain Link TLV of FIG. 14 is shown. The Remote AS Number Sub-TLV includes, in some embodiments, a Type field, a Length field, and a Remote AS Number field. The Type field is an identifier of the Remote AS Number Sub-TLV. The type of the Remote AS Number Sub-TLV may be a numeric value that is assigned to the Remote AS Number Sub-TLV at a later time and a particular value of the Type field of the Remote AS Number Sub-TLV is not limited herein. The Length field indicates a length of the Remote AS Number field. For example, the Length field may indicate a length of four octets for the Remote AS Number field. The Remote AS Number field includes an identification of an AS Number of a remote controller associated with an end point of a connection associated with the connection and access object. In embodiments of the Remote AS Number Sub-TLV in which the Remote AS Number field is four octets in length and only two octets are used to identify the Remote AS Number, two of the four octets (e.g., the leftmost or high-order two octets) are set to zero.

Referring now to FIG. 17, an embodiment of a Remote Area-ID Sub-TLV suitable for implementation in the Inter-Domain Link Sub-TLVs field of the Inter-Domain Link TLV of FIG. 14 is shown. The Remote Area-ID Sub-TLV includes, in some embodiments, a Type field, a Length field, and an Area Number field. The Type field is an identifier of the Remote Area-ID Sub-TLV that indicates a type of the Remote Area-ID Sub-TLV. The type of the Remote Area-ID Sub-TLV may be a numeric value that is assigned to the Remote Area-ID Sub-TLV at a later time and a particular value of the Type field of the Remote Area-ID Sub-TLV is not limited herein. The Length field indicates a length of the Area Number field. For example, the Length field may indicate a length of four octets for the Area Number field. The Area Number field includes an identification of an area or domain in which a remote node of a connection associated with the connection and access object is located.

Referring now to FIG. 18, an embodiment of a Remote OSPF Router-ID Sub-TLV suitable for implementation in the Inter-Domain Link Sub-TLVs field of the Inter-Domain Link TLV of FIG. 14 is shown. The Remote OSPF Router-ID Sub-TLV includes, in some embodiments, a Type field, a Length field, and an OSPF Router ID field. The Type field is an identifier of the Remote OSPF Router-ID Sub-TLV that indicates a type of the Remote OSPF Router-ID Sub-TLV. The type of the Remote OSPF Router-ID Sub-TLV may be a numeric value that is assigned to the Remote OSPF Router-ID Sub-TLV at a later time and a particular value of the Type field of the Remote OSPF Router-ID Sub-TLV is not limited herein. The Length field indicates a length of the OSPF Router ID field. For example, the Length field may indicate a length of four octets for the OSPF Router ID field. The OSPF Router ID field includes an identification of a router capable of performing OSPF routing and which is associated with a remote node of a connection associated with the connection and access object.

Referring now to FIG. 19, an embodiment of an ISIS Router-ID Sub-TLV suitable for implementation in the Inter-Domain Link Sub-TLVs field of the Inter-Domain Link TLV of FIG. 14 is shown. The ISIS Router-ID Sub-TLV includes, in some embodiments, a Type field, a Length field, and an ISO Node-ID field. The Type field is an identifier of the ISIS Router-ID Sub-TLV that indicates a type of the ISIS Router-ID Sub-TLV. The type of the ISIS Router-ID Sub-TLV may be a numeric value that is assigned to the ISIS Router-ID Sub-TLV at a later time and a particular value of the Type field of the ISIS Router-ID Sub-TLV is not limited herein. The Length field indicates a length of the ISO Node-ID field. For example, the Length field may indicate a length of six octets for the ISO Node-ID field. The ISO Node-ID field includes an identification of a node conforming to ISO standards which is capable of performing ISIS routing and which is associated with a remote node of a connection associated with the connection and access object.

Referring now to FIG. 20, an embodiment of an IPv4 Remote ASBR ID Sub-TLV suitable for implementation in the Inter-Domain Link Sub-TLVs field of the Inter-Domain Link TLV of FIG. 14 is shown. The IPv4 Remote ASBR ID Sub-TLV includes, in some embodiments, a Type field, a Length field, and an IPv4 Remote ASBR ID field. The Type field is an identifier of the IPv4 Remote ASBR ID Sub-TLV that indicates a type of the IPv4 Remote ASBR ID Sub-TLV. The type of the IPv4 Remote ASBR ID Sub-TLV may be a numeric value that is assigned to the IPv4 Remote ASBR ID Sub-TLV at a later time and a particular value of the Type field of the IPv4 Remote ASBR ID Sub-TLV is not limited herein. The Length field indicates a length of the IPv4 Remote ASBR ID field. For example, the Length field may indicate a length of four octets for the IPv4 Remote ASBR ID field. The IPv4 Remote ASBR ID field includes an identification of an ASBR associated with a remote node of a connection associated with the connection and access object. In some embodiments, when an ASBR neighboring a remote node has an IPv4 address, the IPv4 Remote ASBR ID Sub-TLV is included within the Inter-Domain Link TLV.

Referring now to FIG. 21, an embodiment of an IPv6 Remote ASBR ID Sub-TLV suitable for implementation in the Inter-Domain Link Sub-TLVs field of the Inter-Domain Link TLV of FIG. 14 is shown. The IPv6 Remote ASBR ID Sub-TLV includes, in some embodiments, a Type field, a Length field, and an IPv6 Remote ASBR ID field. The Type field is an identifier of the IPv6 Remote ASBR ID Sub-TLV that indicates a type of the IPv6 Remote ASBR ID Sub-TLV. The type of the IPv6 Remote ASBR ID Sub-TLV may be a numeric value that is assigned to the IPv6 Remote ASBR ID Sub-TLV at a later time and a particular value of the Type field of the IPv6 Remote ASBR ID Sub-TLV is not limited herein. The Length field indicates a length of the IPv6 Remote ASBR ID field. For example, the Length field may indicate a length of sixteen octets for the IPv6 Remote ASBR ID field. The IPv6 Remote ASBR ID field includes an identification of an ASBR associated with a remote node of a connection associated with the connection and access object. In some embodiments, when an ASBR neighboring a remote node has an IPv6 address, the IPv6 Remote ASBR ID Sub-TLV is included within the Inter-Domain Link TLV.

Referring now to FIG. 22, an embodiment of a Local Interface IPv4 Address Sub-TLV suitable for implementation in the Inter-Domain Link Sub-TLVs field of the Inter-Domain Link TLV of FIG. 14 is shown. The Local Interface IPv4 Address Sub-TLV includes, in some embodiments, a Type field, a Length field, and a Local Interface IPv4 Address(es) field. The Type field is an identifier of the Local Interface IPv4 Address Sub-TLV that indicates a type of the Local Interface IPv4 Address Sub-TLV. The type of the Local Interface IPv4 Address Sub-TLV may be a numeric value that is assigned to the Local Interface IPv4 Address Sub-TLV at a later time and a particular value of the Type field of the Local Interface IPv4 Address Sub-TLV is not limited herein. The Length field indicates a length of the Local Interface IPv4 Address(es) field. For example, the Length field may indicate a length of 4 N octets for the Local Interface IPv4 Address(es) field, wherein N is a number of IPv4 addresses included in the Local Interface IPv4 Address(es) field. The Local Interface IPv4 Address(es) field includes one or more IPv4 addresses of one or more interfaces corresponding to the inter-domain link, wherein the interfaces are associated with a local node of a connection associated with the connection and access object.

Referring now to FIG. 23, an embodiment of a Remote Interface IPv4 Address Sub-TLV suitable for implementation in the Inter-Domain Link Sub-TLVs field of the Inter-Domain Link TLV of FIG. 14 is shown. The Remote Interface IPv4 Address Sub-TLV includes, in some embodiments, a Type field, a Length field, and a Neighbor Interface IPv4 Address(es) field. The Type field is an identifier of the Remote Interface IPv4 Address Sub-TLV that indicates a type of the Remote Interface IPv4 Address Sub-TLV. The type of the Remote Interface IPv4 Address Sub-TLV may be a numeric value that is assigned to the Remote Interface IPv4 Address Sub-TLV at a later time and a particular value of the Type field of the Remote Interface IPv4 Address Sub-TLV is not limited herein. The Length field indicates a length of the Neighbor Interface IPv4 Address(es) field. For example, the Length field may indicate a length of 4 N octets for the Neighbor Interface IPv4 Address(es) field, wherein N is a number of neighbor IPv4 addresses included in the Neighbor Interface IPv4 Address(es) field. The Neighbor Interface IPv4 Address(es) field includes one or more neighbor IPv4 addresses of one or more neighbor interfaces corresponding to the inter-domain link, wherein the neighbor interfaces are associated with a remote node of a connection associated with the connection and access object. The neighbor IPv4 addresses, in some embodiments, are used with the IPv4 addresses of the Local Interface IPv4 Address Sub-TLV of FIG. 22 to determine multiple parallel links between domains and/or network elements.

A Remote Interface IPv6 Address Sub-TLV (not shown) may be substantially similar to the Remote Interface IPv4 Address Sub-TLV with having a Neighbor Interface IPv6 Address(es) field in place of the Neighbor Interface IPv4 Address(es), in which case the Neighbor Interface IPv6 Address(es) field has a length of 16 N octets, where N is a number of neighbor IPv6 addresses included in the Neighbor Interface IPv6 Address(es) field. The neighbor IPv6 addresses, in some embodiments, are used with the IPv6 addresses of the Local Interface IPv6 Address Sub-TLV to determine multiple parallel links between domains and/or network elements.

Figure 24:
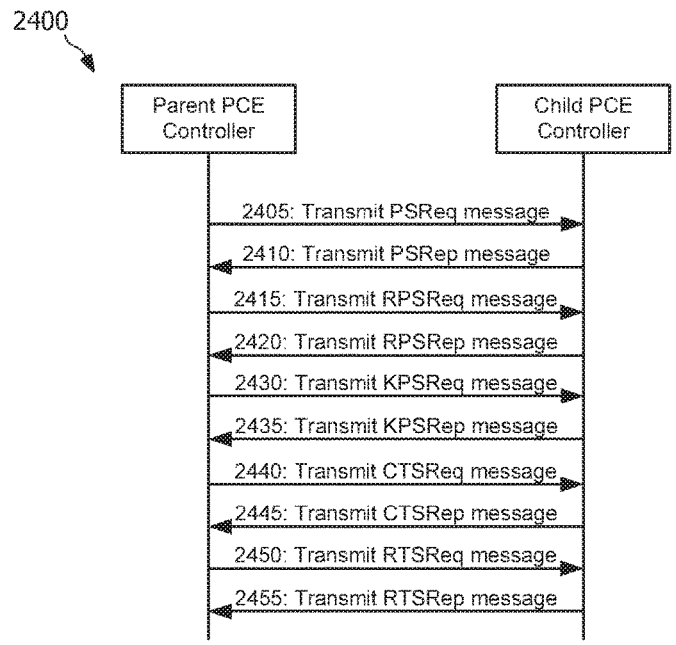
FIG. 24 is an embodiment of a protocol diagram of routing data traffic between a parent PCE controller and a child PCE controller according to HSCS.

Referring now to FIG. 24, an embodiment of a protocol diagram 2400 of routing data traffic between a parent PCE controller (e.g., the parent PCE controller 106) and a child PCE controller (e.g., any one of the child PCE controllers 108) according to HSCS is shown. A parent PCE controller is configured to control a plurality of child PCE controllers (e.g., first level child PCE controllers), any one or more of which may be configured to control second level child controllers. Each of the first level child PCE controllers controls a corresponding domain that has connections to domains of the other child PCE controllers. Additionally, in embodiments of the PCE architecture that include child controllers, each of the child controllers may control corresponding domains. A protocol of the first level child PCE controllers controlling the second level child PCE controllers may be substantially similar to a process of the parent PCE controller controlling the first level child PCE controllers and a description of which is not repeated herein.

In some embodiments, the parent PCE controller may have no, or limited, detailed information and knowledge of the domains controlled by the child PCE controllers. In such embodiments, when the parent PCE controller receives a request to route data traffic from a source node to a destination node (e.g., source and destination network elements), the parent PCE controller transmits one or more requests to the child PCE controllers to compute, remove, and/or keep path segments through the domains controlled by the child PCE controllers for routing the data traffic from the source to the destination. Additionally, the parent PCE controller may transmit one or more requests to the child PCE controllers to create and/or remove tunnel segments corresponding to the path segments through the domains controlled by the child PCE controllers. In some embodiments, the child PCE controllers transmit a reply to the parent PCE controller after receiving a request to perform an action, or after performing the action. It should be noted that while a plurality of steps may be illustrated in the protocol diagram 2400, any one or more of the steps may be omitted, performed substantially simultaneously with another step, or performed in an order with respect to the other steps of the protocol diagram 2400, or steps not shown, that varies from an exemplary order shown in FIG. 24, unless otherwise stated.

When a parent PCE controller receives a request to create an E2E tunnel (e.g., to route data or communications) from a source to a destination, the parent PCE controller allocated a global tunnel identifier (GTID) for the E2E tunnel (e.g., so that an E2E tunnel that crosses multiple domains may be globally identified) and a path identifier (PID) for a E2E path to be computed for the E2E tunnel. Subsequently, at step 2405, the parent PCE controller transmits a compute path segment request message (e.g., PSReq message) to each of its child PCE controllers for computing a set of path segments in the respective domains controlled by each of the child PCE controllers. When the parent PCE controller receives the path segments from the child PCE controllers, the parent PCE controller builds a shortest path first tree (SPT) according to the path segments to determine a shortest path from the source to the destination that satisfies any constraints that the routing must adhere to (e.g., constraints received with the routing request such as bandwidth, etc.). It should be noted that in this embodiment, particular details of each path segment may be hidden from the parent PCE controller such that each path segment is visible to the parent PCE controller only as a link between two boundary nodes of a domain controlled by a respective child PCE controller and a cost (e.g., in time, distance, nodes traversed, etc.) associated with the link between the two boundary nodes. As such, an E2E path determined by the parent PCE controller may not have details pertaining to all, or any, nodes that will be traversed via the E2E path and may be referred to as a domain path.

In some embodiments, a PSReq message suitable for transmission from a parent PCE controller to a child PCE controller includes an address or identifier of a starting node in the domain controlled by the respective child PCE controller (e.g., a source node if the source is within the child PCE controller's domain or a boundary node that is connected to a boundary node of another child PCE controller's domain). The starting node is the node from which a number of path segments are to be computed. The PSReq message also includes the GTID and PID allocated by the parent PCE controller, an exception list containing a list of nodes (e.g., network elements) that are already located on the SPT of the parent PCE controller (e.g., as a result of previous PSReq messages), any constraints that the path segments should adhere to, and a destination node.

When the destination node is in the domain of the child PCE controller, the child PCE controller computes a shortest path between the starting node and the destination node within the child PCE controller's domain. When the destination node is not in the domain of the child PCE controller, the child PCE controller computes a shortest path between the starting node and each boundary node of the child PCE controller's domain. The PSReq message may further include options for computing the path segments through the child PCE controller's domain such as, for example, an exception flag (e.g., a 1-bit value) that indicates that the child PCE controller should compute the shortest path segment that satisfies any provided constraints from the starting node to each boundary or edge node in the child PCE controller's domain except for the nodes included within the exception list. The exception flag is set to "1," for example, when there is not a previous hop of node X in the child PCE controller's domain. In some embodiments, a format of the PSReq message is as shown below in Table 3.

shortest path segment that satisfies any constraints provided from the starting node to each edge node of domains adjacent to the domain of the child PCE controller except for nodes in the exception list when the exception flag is set to "1" using the inter-domain links attached to the starting node if the starting node is an edge node of the child PCE controller's domain and an end point of an inter-domain link. Subsequently, at step 2410, the child PCE controller transmits a compute path segment reply message (e.g., PSRep message) to the parent PCE controller, where the PSRep message contains the computed path segments. The details of the computed path segments, for example, particular nodes within the child PCE controller's domain which are included in the computed path segments are not included in the PSRep message and visible to the parent PCE controller, but rather each computed path segment is represented as a link between two edge nodes of the child PCE controller's domain and a cost to traverse the link.

In some embodiments, a PSRep message suitable for transmission from a child PCE controller to a parent PCE controller includes the GTID and PID allocated by the parent PCE controller and received by the child PCE controller in the PSReq message, the address or identifier of the starting node in the domain controlled by the child PCE controller, and, for each path computed through the child PCE controller's domain, an address or identifier of a destination or edge node and a cost of the computed path from the starting node to the destination or edge node. The child PCE controller, in some embodiments, stores the details (e.g., each node within the child PCE controller's domain which is traversed along to a computed path) of each computed path, along with an association to the GTID and the PID, in a data structure accessible to the child PCE

TABLE 3

| <PSReq Message> | ::= | <Common Header> [<svec-list>] <path-segment-request-list> |
|---|---|---|
| where: | | |
| <svec-list> | ::= | <SVEC>[<svec-list>] |
| <path-segment-request-list> | ::= | <path-segment-request> [<path-segment-request-list>] |
| <path-segment-request> | ::= | <CRP> <Start-Node> <Tunnel-ID> <Path-ID> [<Destination>] [<OF>] [<LSPA>][<BANDWIDTH>] [<metric-list>][<RRO>[<BANDWIDTH>]] [<IRO>] [<LOAD-BALANCING>] <exception-list> |

After receiving the PSReq message, the child PCE controller computes the path segments according to, and as requested by, the PSReq message. For example, the child PCE controller computes shortest path segments that satisfy any constraints provided from the starting node to the destination node, if present, or each edge node of the child PCE controller's domain except for nodes in the exception list when the exception flag is set to "1." Additionally, in some embodiments the child PCE controller computes a controller when the child PCE controller transmits the PSRep message to the parent PCE controller. The child PCE controller may delete the path segments computed for a given GTID and PID if the child PCE controller does not receive any request from the parent PCE controller for keeping the computed path segments for a given period of time, a length of which is not limited herein. In some embodiments, a format of the PSRep message is as shown below in Table 4.

TABLE 4

| <PSRep Message> | ::= | <Common Header> <path-segment-reply-list> |
|---|---|---|
| where: | | |
| <path-segment-reply-list> | ::= | <path-segment-reply> [<path-segment-reply-list>] |

TABLE 4-continued

| | | |
|---|---|---|
| <path-segment-reply> | ::= | <CRP><br><Tunnel-ID> <Path-ID><br><Start-Node><br>[ <NO-PATH> \| <segment-end-List> ]<br>[<metric-list>] |

After a shortest path satisfying a set of constraints, if any are provided, between a source and a destination is computed by the parent PCE controller (e.g., based at least in part on contents of one or more PSRep messages received by the parent PCE controller), at step 2415 the parent PCE controller transmits a request message for removing path segments (e.g., a RPSReq message) to delete path segments computed and stored by one or more child PCE controllers when the path segments are not a part of the shortest path. The RPSReq message, in some embodiments comprises the GTID associated with the computed path segments. In such embodiments, when a child PCE controller receives the RPSReq message, the child PCE controller removes all computed path segments stored with an association to the GTID. In other embodiments the RPSReq message comprises the GTID and the PID. In such embodiments, when a child PCE controller receives the RPSReq message, the child PCE controller removes all computed path segments stored with an association to the GTID and the PID. In other embodiments, the RPSReq message comprises the GTID, the PID, and a list of starting node addresses or identifiers. In such embodiments, when a child PCE controller receives the RPSReq message, the child PCE controller removes all computed path segments stored with an association to the GTID and the PID and having the starting node with an address included in the list of starting node addresses. In other embodiments, the RPSReq message comprises the GTID, the PID, a list of starting node addresses or identifiers, and a list of node pairs (e.g., starting node address with a corresponding ending node address for a respective path segment). In such embodiments, when a child PCE controller receives the RPSReq message, the child PCE controller removes all, or some, computed path segments stored with an association to the GTID and the PID and having a starting node and ending node included in the list of node pairs. In some embodiments the child PCE controller further removes all, or some, computed path segments stored with an association to the GTID and the PID and having the starting node with an address included in the list of starting node addresses.

After receiving the RPSReq message, the child PCE controller removes one or more computed path segments stored by the child PCE controller according to the RPSReq message. Subsequently, at step 2420, the child PCE controller transmits a remove path segment reply message (e.g., RPSRep message) to the parent PCE controller. The RPSRep message, in some embodiments, includes the GTID and the PID, a status of the path segment removal according to the RPSReq message (e.g., a status of "success" indicating that the path segments requested for removal have been successfully removed or a status of "fail" indicating that the path segments requested for removal cannot be removed), and, when the status is "fail," an error code and reasons for the failure to remove the requested path segments. In some embodiments, a format of the RPSRep message is as shown below in Table 5.

TABLE 5

| | | |
|---|---|---|
| <RPSRep Message> | ::= | <Common Header><br><remove-path-segment-reply-list> |
| where: | | |
| <remove-path-segment-reply-list> | ::= | <remove-path-segment-reply><br>[<remove-path-segment-reply-list>] |
| <remove-path-segment-reply> | ::= | <CRP><br><Tunnel-ID> [<Path-ID>]<br><Status><br>[<Reasons>] |

After a shortest path satisfying a set of constraints, if any are provided, between a source and a destination is computed by the parent PCE controller (e.g., based at least in part on contents of one or more PSRep messages received by the parent PCE controller), at step 2430 the parent PCE controller transmits a request message for keeping path segments (e.g., a KPSReq message) to request that one or more child PCE controllers keep path segments computed and stored by the child PCE controllers (e.g., path segments which are a part of the shortest path determined by the parent PCE controller). The KPSReq message, in some embodiments comprises the GTID and the PID, as well as a list of node pairs (e.g., starting node address with a corresponding ending node address for a respective path segment). In some embodiments, a format of the KPSRep message is as shown below in Table 6.

TABLE 6

| | | |
|---|---|---|
| <KPSReq Message> | ::= | <Common Header><br><keep-path-segment- request -list> |
| where: | | |
| <keep-path-segment-request-list> | ::= | <keep-path-segment- request ><br>[<keep -path-segment- request -list>] |
| <keep-path-segment-request> | ::= | <CRP><br><Tunnel-ID> [<Path-ID>]<br><segment-list> |
| <segment-list> | ::= | <Segment> [<segment-list>] |
| <Segment> | ::= | <Segment-Start> <Segment-End> |

After receiving the KPSReq message, the child PCE controller keeps one or more computed path segments stored by the child PCE controller according to the KPSReq message. In some embodiments, the path segments are associated with and/or included in the shortest path computed by the parent PCE controller. In some embodiments, the child PCE controller removes one or more path segments that were previously stored by the child PCE controller but are not included in the KPSReq message. Subsequently, at step 2435, the child PCE controller transmits a keep path segment reply message (e.g., KPSRep message) to the parent PCE controller. The KPSRep message, in some embodiments, includes the GTID and the PID, a status of path segment retention according to the KPSReq message (e.g., a status of "success" indicating that the path segments requested for retention have been successfully kept by the child PCE controller or a status of "fail" indicating that the path segments requested for retention cannot be kept by the child PCE controller), and, when the status is "fail," an error code and reasons for the failure to keep the requested path segments. In some embodiments, a format of the KPSRep message is as shown below in Table 7.

TABLE 7

| <KPSRep Message> | ::= | <Common Header> <keep-path-segment-reply-list> |
|---|---|---|
| where: | | |
| <keep-path-segment-reply-list> | ::= | <keep-path-segment-reply> [<keep-path-segment-reply-list>] |
| <keep-path-segment-reply> | ::= | <CRP> <Tunnel-ID> [<Path-ID>] <Status> [<Reasons>] |

In addition to the above embodiments in which the parent PCE controller may not have detailed information and knowledge of the domains controlled by the child PCE controllers, in other embodiments, the parent PCE controller has detailed information and knowledge of the domains controlled by the child PCE controllers of the parent PCE controller. The parent PCE controller may have the information, for example, as a result of one or more CAAdv messages transmitted by the child PCE controllers to the parent PCE controller. In such embodiments, when the parent PCE controller receives a request to route data traffic from a source to a destination through at least a portion of the domains, the parent PCE controller computes path segments that cross the domains. In either embodiment, when the parent PCE controller does not have detailed information and knowledge of the domains or when the parent PCE controller has detailed information and knowledge of the domains, after determining the computed path segments, at step 2440, the parent PCE controller transmits one or more create tunnel segment request messages (e.g., a CTSReq message) to the child PCE controllers to create tunnel segments (e.g., by assigning labels to the tunnel segments and determining or writing cross connects, etc.) corresponding to the computed path segments. In some embodiments, the tunnels cross multiple domains. The parent PCE controller transmits the CTSReq messages, in some embodiments, in a reverse order of the shortest path such that a child PCE controller that controls a domain in which the destination node is located receives a first CTSReq message transmitted by the parent PCE controller and a child PCE controller that controls a domain in which the source node is located receives a last CTSReq message transmitted by the parent PCE controller.

In some embodiments, a CTSReq message suitable for transmission from the parent PCE controller to the child PCE controller includes the GTID and PID allocated by the parent PCE controller, either a path segment from a start point to an end point (e.g., for a parent PCE controller that does not have detailed information and knowledge of the domains) or a path segment details and an Explicit Route Object (ERO) (e.g., for a parent PCE controller that has detailed information and knowledge of the domains), and a label and an interface if the domain controlled by the child PCE controller receiving the CTSReq message does not contain the destination node. In some embodiments, a format of the CTSReq message is as shown below in Table 8.

TABLE 8

| < CTSReq Message> | ::= | <Common Header> <create-tunnel-segment-request-list> |
|---|---|---|
| where: | | |
| <create-tunnel-segment-request-list> | ::= | <create-tunnel-segment-request> [<create-tunnel-segment-request-list>] |
| <create-tunnel-segment-request> | ::= | <CRP> <Tunnel-ID> [<Path-ID>] <Path-Segment> [<Label> <Interface>] |
| <Path-Segment> | ::= | [<Segment-Start> <Segment-End> \| <ERO>] |

After receiving the CTSReq message, when the parent PCE controller does not have detailed information and knowledge of the domain, the child PCE controller allocates and reserves link bandwidth along the path segment identified by the start point and the end point, and details for which the child PCE controller has previously stored along with an association to the GTID and the PID, assigns labels along the path segment, and writes cross connects on each of the nodes along the path segment. When the parent PCE controller has detailed information and knowledge of the domain, the child PCE controller assigns labels along the path segment ERO and writes cross connects on each of the nodes along the path segment. When the parent PCE controller has detailed information and knowledge of the domain, link bandwidth along the path segment is allocated and reserved by the parent PCE controller instead of by the child PCE controller. For a child PCE controller controlling a domain that does not include the destination node, the child PCE controller writes the cross connect on an edge or boundary node to a downstream domain using a label and interface of the downstream domain that was received by the child PCE controller in the CTSReq message from the parent PCE controller. For a child PCE controller controlling a domain which does not include the source node, the child PCE controller includes a label and an interface in a reply message to the parent PCE controller. The interface connects an edge node of an upstream domain along the E2E path and the label is allocated for the interface on a node that is a next hop of the edge node.

After creating the tunnel segments according to the CTSReq message, at step 2445, the child PCE controller transmits a create tunnel segment reply message (e.g., CTSRep message) to the parent PCE controller. The CTSRep message, in some embodiments, includes the GTID and the PID, a status of tunnel segment creation according to the CTSReq message (e.g., a status of "success" indicating that the requested tunnel segments have been successfully created by the child PCE controller or a status of "fail" indicating that the requested tunnel segments cannot be created by the child PCE controller), when the status is "fail," an error code and reasons for the failure to create the requested tunnel segments, and when the domain controlled by the respective child PCE controller transmitting the CTSRep message and the status is "success," a label and an interface, as discussed above. In some embodiments, a format of the CTSRep message is as shown below in Table 9.

TABLE 9

| <CTSRep Message> | ::= | <Common Header> <create-tunnel-segment-reply-list> |
|---|---|---|
| where: | | |
| <create-tunnel-segment-reply-list> | ::= | <create-tunnel-segment-reply> [<create-tunnel-segment-reply-list>] |
| <create-tunnel-segment-reply> | ::= | <CRP> <Tunnel-ID> [<Path-ID>] <Status> [<Label> <Interface>] [<Reasons>] |

After creating tunnel segments, in some embodiments the parent PCE controller receives a request to delete at least one of the tunnel segments. The request is received from, for example, a user or an application. Additionally, when the parent PCE controller receives a CTSRep message from a child PCE controller that includes a status of "fail," or when the parent PCE controller is requested to remove a tunnel segment, at step 2450 the parent PCE controller transmits a remove tunnel segment request message (e.g., a RTSReq message) to a child PCE controller to delete the tunnel segment. In some embodiments, a RTSReq message suitable for transmission from the parent PCE controller to the child PCE controller includes the GTID and PID allocated by the parent PCE controller. In some embodiments, a format of the RTSReq message is as shown below in Table 10.

TABLE 10

| <RTSReq Message> | ::= | <Common Header> <remove-tunnel-segment-request-list> |
|---|---|---|
| where: | | |
| <remove-tunnel-segment-request-list> | ::= | <remove-tunnel-segment-request> [<remove-tunnel-segment-request-list>] |
| <remove-tunnel-segment-request> | ::= | <CRP> <Tunnel-ID> [<Path-ID>] |

After receiving the RTSReq message, the child PCE controller releases labels assigned along the path segments within the child PCE controller's domain and associated with the GTID and PID and removes the cross connects on each node along the path segments. When the child PCE controller also reserved the link bandwidth associated with the GTID and PID (e.g., such as when the parent PCE controller does not have detailed knowledge or information of the domain) the child PCE controller releases the reserved link bandwidth. After removing the tunnel segment as requested by the parent PCE controller in the RTSReq message, at step 2455 the child PCE controller transmits a remove tunnel segment reply message (e.g., a RTSRep message) to the parent PCE controller. The RTSRep message, in some embodiments, includes the GTID and PID, a status of tunnel removal according to the RTSReq message (e.g., a status of "success" indicating that the requested tunnel segments have been successfully removed by the child PCE controller or a status of "fail" indicating that the requested tunnel segments cannot be removed by the child PCE controller), and when the status is "fail," an error code and reasons for the failure to remove the requested tunnel segments. In some embodiments, a format of the RTSRep message is as shown below in Table 11.

TABLE 11

```
    <RTSRep Message>              ::=  <Common Header>
                                       <remove-tunnel-segment-reply-list>
where:
    <remove-tunnel-segment-reply-list>  ::=  <remove-tunnel-segment-reply>
                                       [<remove-tunnel-segment-reply-list>]
        <remove-tunnel-segment-reply>   ::=  <CRP>
                                       <Tunnel-ID> [<Path-ID>]
                                       <Status>
                                       [<Reasons>]
```

The messages according to various embodiments of the present disclosure (e.g., the request and reply messages, Open Message, Discovery messages, etc., as discussed above) are encoded to enable a PCEP network element receiving the message to determine a type of the message, a length of the message, and optionally, other information pertaining to the message.

Figure 25:
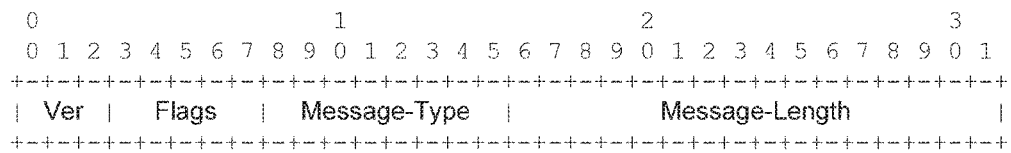
FIG. 25 is an embodiment of a common header for use in messages according to various embodiments of the present disclosure.

In some embodiments, the encoding is an individual encoding in which a message type for the message is defined at a top level for each of the messages. Referring now to FIG. 25, an embodiment of a common header for use in messages according to various embodiments of the present disclosure is shown. The common header is suitable for implementation as a <common-header> in the messages according to various embodiments of the present disclosure, as shown above. The common header is implemented in a message transmitted between two PCEP network elements, such as a parent PCE controller and a child PCE controller (e.g., between the parent PCE controller 106 and any one or more of the child PCE controllers 108). The common header includes a Version field, a Flags field, a Message Type field, and a Message Length field. The Version field, Flags field, and Message Length field may be as defined in IETF RFC 5440. The Message Type field indicates to the PCEP network element receiving the message a type of the message. To support the HSCS of various embodiments of the present disclosure in a manner in which messages are individually encoded (e.g., each message has a unique message type), message types included in the Message Type field may be expanded to include the messages of various embodiments of the present disclosure. For example, as shown in the below Table 12, messages types 1 through 7 may be defined in IETF RFC 5440 and messages types mTBD1 through mTBD12 are newly defined message types corresponding to the messages of various embodiments of the present disclosure. It should be noted that the message type, for this and following embodiments, may be a numeric value that is assigned to the messages of various embodiments of the present disclosure (where a message type is not repeated across multiple messages) at a later time, and a particular value of the message type for any of the messages of various embodiments of the present disclosure is not limited herein.

TABLE 12

| Message-Type | Meaning |
| --- | --- |
| 1 | Open |
| 2 | Keepalive |
| 3 | Path Computation Request |
| 4 | Path Computation Reply |
| 5 | Notification |
| 6 | Error |
| 7 | Close |
| mTBD1 | Message for Controller Relation Discovery |
| mTBD2 | Message for Connections and Accesses Advertisement |
| mTBD3 | Request Message for Path Segment Computation |
| mTBD4 | Reply Message for Path Segment Computation |
| mTBD5 | Request Message for Removing Path Segment |
| mTBD6 | Reply Message for Removing Path Segment |

TABLE 12-continued

| Message-Type | Meaning |
| --- | --- |
| mTBD7 | Request Message for Keeping Path Segment |
| mTBD8 | Reply Message for Keeping Path Segment |
| mTBD9 | Request Message for Creating Tunnel Segment |
| mTBD10 | Reply Message for Creating Tunnel Segment |
| mTBD11 | Request Message for Removing Tunnel Segment |
| mTBD12 | Reply Message for Removing Tunnel Segment |

In other embodiments, the encoding is a group encoding in which message types for the messages according to various embodiments of the present disclosure are grouped according to any desired grouping methodology into any desired number of groups. For example, the messages according to various embodiments of the present disclosure are grouped into request messages and reply messages such that, in one embodiment, in addition to the message types 1 through 7 shown above and not repeated again herein, message types for inclusion in the Message Type field of the common header according to group encoding include those as shown in the below Table 13.

TABLE 13

| Message-Type | Meaning |
| --- | --- |
| mTBD1 | Message for Controller Relation Discovery |
| mTBD2 | Message for Connections and Accesses Advertisement |
| mTBD3 | Request Message for Tunnel Segment Operation |
| mTBD4 | Reply Message for Tunnel Segment Operation |

The Tunnel Segment Operation, in various embodiments, is any one of creating a segment of an E2E tunnel, removing a segment of an E2E tunnel, computing path segments for use in determining an E2E tunnel, removing path segments computed for use in determining an E2E tunnel, and/or keeping path segments computed for use in determining an E2E tunnel. A particular type of the various Tunnel Segment Operations may be indicated to a PCEP network element receiving the common header, in some embodiments, via another portion of the message (e.g., as a value in an options field of the CRP object, as discussed above).

In other embodiments, the encoding is an embedded encoding in which the messages according to various embodiments of the present disclosure are embedded within existing messages for which a type is already defined in IETF RFC 5440(e.g., the Path Computation Request message and the Path Computation Reply message). In such embodiments, an options/operations field is defined in an existing field or object of the existing messages. In this way, request messages for supporting HSCS according to various embodiments of the present disclosure are represented by an options value included within the Path Computation Request message and reply messages for supporting HSCS according to various embodiments of the present disclosure are represented by an options value included within the Path Computation Reply message. It should be noted that the options value may be a numeric value that is assigned to the messages of various embodiments of the present disclosure (where an options value is not repeated across multiple messages) at a later time, and a particular value of the options value for any of the messages of various embodiments of the present disclosure is not limited herein.

In the embedded encoding, the Controller Relation Discovery message is encoded, in some embodiments, as an Open message having a flag or options value defined in an existing field or object of the Open message (e.g., in an SRP object). The Connection and Accesses Advertisement message is encoded, in some embodiments, as a report message having a flag or options value defined in an existing field or object of the Report message (e.g., in an SRP object).

In other embodiments, the messages according to various embodiments of the present disclosure are encoded in a mixed or hybrid encoding according to any plurality of the above encoding manners. For example, one embodiment of mixed or hybrid encoding comprises encoding the Connections and Accesses Advertisement message according to individual encoding and encoding the Controller Relation Discovery message and the request and reply messages for supporting HSCS according to embedded encoding. In another embodiment of mixed encoding, the Controller Relation Discovery message is encoded according to embedded encoding, the Connections and Accesses Advertisement message is encoded according to individual encoding, and the request and reply messages for supporting HSCS are encoded according to group encoding.

Figure 26:
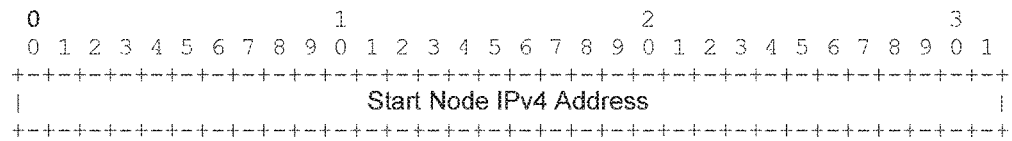
FIG. 26 is an embodiment of a Start-Node object for use in messages according to various embodiments of the present disclosure.

Referring now to FIG. 26, an embodiment of a Start-Node object is shown. The Start-Node object may be implemented in any of the messages according to various embodiments of the present disclosure to indicate an identification of a start node for an E2E tunnel. For example, the Start-Node object is suitable for implementation, in some embodiments, in the various messages transmitted between a parent PCE controller (e.g., the parent PCE controller 106) and a child PCE controller (e.g., any one or more of the child PCE controllers 108) as depicted in the protocol diagram 2400 of FIG. 24, for example, in a <Start-Node> field. The Start-Node object may be identified by an object class and an object type, each of which may be numeric values that are assigned to the Start-Node object at a later time, and a particular value of the object class and object type of the Start-Node object is not limited herein. The Start-Node object, in some embodiments, comprises an Internet Protocol (IP) address (e.g., an IPv4 address or an IPv6 address) of the start node and a length of the Start-Node object may be determined according to the type of IP address (e.g., a length of 8 octets for an IPv4 address or a length of 20 octets for an IPv6 address).

Referring now to FIG. 27, an embodiment of a Destination-Node-List object is shown. The Destination-Node-List object may be implemented in any of the messages according to various embodiments of the present disclosure to indicate an identification of a destination node for an E2E tunnel. For example, the Destination-Node-List object is suitable for implementation, in some embodiments, in the various messages transmitted between a parent PCE controller (e.g., the parent PCE controller 106) and a child PCE controller (e.g., any one or more of the child PCE controllers 108) as depicted in the protocol diagram 2400 of FIG. 24, for example, in a [<Destination>] field, where each respective destination node address is a <Destination> of the Destination-Node-List object [<Destination>]. The Destination-Node-List object may be identified by an object class and an object type, each of which may be numeric values that are assigned to the Destination-Node-List object at a later time, and a particular value of the object class and object type of the Destination-Node-List object is not limited herein. The Destination-Node-List object, in some embodiments, comprises one or more IP addresses (e.g., an IPv4 address or an IPv6 address for each destination node included in the Destination-Node-List object) of the destination node and a length of the Destination-Node-List object may be determined according to the type of IP address (e.g., a length of 4+4N octets for the object with N IPv4 addresses or a length of 4+16N octets for the object with N IPv6 addresses).

Referring now to FIG. 28, an embodiment of a Segment-End-Node-List object is shown. The Segment-End-Node-List object includes one or more Segment End objects and may be implemented in any of the messages according to various embodiments of the present disclosure indicate an identification of an end node for a path segment which may be used for creating an E2E tunnel. For example, the Segment-End-Node-List object is suitable for implementation, in some embodiments, in the various messages transmitted between a parent PCE controller (e.g., the parent PCE controller 106) and a child PCE controller (e.g., any one or more of the child PCE controllers 108) as depicted in the protocol diagram 2400 of FIG. 24, for example, in a [<segment-end-List>] field, where each respective destination node address for a path segment is a <Segment-End> of the list [<segment-end-List>]. The Segment-End-Node-List object may be identified by an object class and an object type, each of which may be numeric values that are assigned to the Segment-End-Node-List object at a later time, and a particular value of the object class and object type of the Segment-End-Node-List object is not limited herein. The Segment-End-Node-List object, in some embodiments, comprises one or more IP addresses (e.g., an IPv4 address or an IPv6 address for each segment end node included in the Segment-End-Node-List object) of the segment end node and a length of the Segment-End-Node-List object may be determined according to the type of IP address (e.g., a length of 430 4N octets for the object with N IPv4 addresses or a length of 4+16N octets for the object with N IPv6 addresses).

Referring now to FIG. 29, an embodiment of an Exception-Node-List object is shown. The Exception-Node-List object includes one or more Exception Nodes and may be implemented in any of the messages according to various embodiments of the present disclosure to indicate an identification of one or more nodes for which a child PCE controller should not calculate a path segment. For example, the Exception-Node-List object is suitable for implementation, in some embodiments, in the various messages transmitted between a parent PCE controller (e.g., the parent PCE controller 106) and a child PCE controller (e.g., any one or more of the child PCE controllers 108) as depicted in the protocol diagram 2400 of FIG. 24, for example, in an <exception-list>field. The Exception-Node-List object may be identified by an object class and an object type, each of which may be numeric values that are assigned to the Exception-Node-List object at a later time, and a particular value of the object class and object type of the Exception-Node-List object is not limited herein. The Exception-Node-List object, in some embodiments, comprises one or more IP addresses (e.g., IPv4 addresses or IPv6 addresses included in the Exception-Node-List object) and a length of the Exception-Node-List object may be determined according to the type and quantity of IP addresses (e.g., a length of 4+4N octets for the object with N IPv4 addresses or a length of 4+16N octets for the object with N IPv6 addresses). The Exception-Node-List object, in some embodiments, is suitable for implementation as an <exception-list>.

Referring now to FIG. 30, an embodiment of a Node-IGP-Metric-List object is shown. The Node-IGP-Metric-List object includes one or more Segment End Node IGP Metric Values and may be implemented in any of the messages according to various embodiments of the present disclosure to indicate metric values associated with one or more end nodes. For example, the Node-IGP-Metric-List object is suitable for implementation, in some embodiments, in the various messages transmitted between a parent PCE controller (e.g., the parent PCE controller 106) and a child PCE controller (e.g., any one or more of the child PCE controllers 108) as depicted in the protocol diagram 2400 of FIG. 24. The Node-IGP-Metric-List object may be identified by an object class and an object type, each of which may be numeric values that are assigned to the Node-IGP-Metric-List object at a later time, and a particular value of the object class and object type of the Node-IGP-Metric-List object is not limited herein. Particular values included in the Segment End Node IGP Metric Value objects may be determined according to an implementation of the Node-IGP-Metric-List object and are not limited herein. A length of the Node-IGP-Metric-List object may be determined according to a quantity of Segment End Node IGP Metric Values included in the Node-IGP-Metric-List object (e.g., a length of 4+4N octets for the object with N IGP Metric Values). In some embodiments, the Node-IGP-Metric-List object may include a Segment End Node IGP Metric Value for each segment end node in an E2E path or tunnel.

Referring now to FIG. 31, an embodiment of a Node-TE-Metric-List object is shown. The Node-TE-Metric-List object includes one or more Segment End Node Traffic Engineering (TE) Metric Values and may be implemented in any of the messages according to various embodiments of the present disclosure to indicate TE metric values associated with one or more end nodes. For example, the Node-TE-Metric-List object is suitable for implementation, in some embodiments, in the various messages transmitted between a parent PCE controller (e.g., the parent PCE controller 106) and a child PCE controller (e.g., any one or more of the child PCE controllers 108) as depicted in the protocol diagram 2400 of FIG. 24. The Node-TE-Metric-List object may be identified by an object class and an object type, each of which may be numeric values that are assigned to the Node-TE-Metric-List object at a later time, and a particular value of the object class and object type of the Node-TE-Metric-List object is not limited herein. Particular values included in the Segment End Node TE Metric Values may be determined according to an implementation of the Node-TE-Metric-List object and are not limited herein. A length of the Node-TE-Metric-List object may be determined according to a quantity of Segment End Node TE Metric Values included in the Node-TE-Metric-List object (e.g., a length of 4+4N octets for the object with N Segment End Node TE Metric Values). In some embodiments, the Node-TE-Metric-List object may include a Segment End Node TE Metric Value for each segment end node in an E2E path or tunnel.

Referring now to FIG. 32, an embodiment of a Node-Hop-Count-List object is shown. The Node-Hop-Count-List object includes one or more Segment End Node Hop Counts Values and may be implemented in any of the messages according to various embodiments of the present disclosure to indicate a number of hops (e.g., network elements) that are traversed from a starting node of a path segment to an end node of the path segment. For example, the Node-Hop-Count-List object is suitable for implementation, in some embodiments, in the various messages transmitted between a parent PCE controller (e.g., the parent PCE controller 106) and a child PCE controller (e.g., any one or more of the child PCE controllers 108) as depicted in the protocol diagram 2400 of FIG. 24. The Node-Hop-Count-List object may be identified by an object class and an object type, each of which may be numeric values that are assigned to the Node-Hop-Count-List object at a later time, and a particular value of the object class and object type of the Node-Hop-Count-List object is not limited herein. Particular values included in the Segment End Node Hop Counts Values may be determined according to a particular implementation of a PCE architecture and are not limited here. A length of the Node-Hop-Count-List object may be determined according to a quantity of Segment End Node Hop Counts Values included in the Node-Hop-Count-List object (e.g., a length of 4+4 N octets for the object with N Segment End Node Hop Counts Values). In some embodiments, the Node-Hop-Count-List object may include a Segment End Node Hop Counts Value for each segment end node in an E2E path or tunnel.

Referring now to FIG. 33, an embodiment of a Tunnel-ID object is shown. The Tunnel-ID object may be implemented in any of the messages according to various embodiments of the present disclosure to indicate a global identification of the E2E tunnel. For example, in at least some embodiments, the Tunnel-ID object comprises the GTID, discussed above, and is suitable for implementation, in some embodiments, in the various messages transmitted between a parent PCE controller (e.g., the parent PCE controller 106) and a child PCE controller (e.g., any one or more of the child PCE controllers 108) as depicted in the protocol diagram 2400 of FIG. 24, for example, in a <Tunnel-ID>field. The Tunnel-ID object may be identified by an object class and an object type, each of which may be numeric values that are assigned to the Tunnel-ID object at a later time, and a particular value of the object class and object type of the Tunnel-ID object is not limited herein. A length of the Tunnel-ID object may be determined, in some embodiments, according to a length of the GTID (e.g., at least 32 bits).

Referring now to FIG. 34, an embodiment of a Tunnel-Path-ID object is shown. The Tunnel-Path-ID object may be implemented in any of the messages according to various embodiments of the present disclosure to indicate an identification of a path within an E2E tunnel. For example, in at least some embodiments, the Tunnel-Path-ID object comprises the PID, discussed above, and is suitable for implementation, in some embodiments, in the various messages transmitted between a parent PCE controller (e.g., the parent PCE controller 106) and a child PCE controller (e.g., any one or more of the child PCE controllers 108) as depicted in the protocol diagram 2400 of FIG. 24, for example, in a <Path-ID> field. The Tunnel-Path-ID object may be identified by an object class and an object type, each of which may be numeric values that are assigned to the Tunnel-Path-ID object at a later time, and a particular value of the object class and object type of the Tunnel-Path-ID object is not limited herein. A length of the Tunnel-Path-ID object may be determined, in some embodiments, according to a length of the PID (e.g., 32 bits with 16 bits comprises the PID and a reminder of the bits set to "0").

Referring now to FIG. 35, an embodiment of a Status object is shown. The Status object may be implemented in any of the messages according to various embodiments of the present disclosure to indicate a status or result of actions requested of a PCEP network element (e.g., a child PCE controller). For example, the Status object is suitable for implementation, in some embodiments, in the various messages transmitted between a parent PCE controller (e.g., the parent PCE controller 106) and a child PCE controller (e.g., any one or more of the child PCE controllers 108) as depicted in the protocol diagram 2400 of FIG. 24, for example, in a <Status> field. The Status object may be identified by an object class and an object type, each of which may be numeric values that are assigned to the Status object at a later time, and a particular value of the object class and object type of the Status object is not limited herein. In at least some embodiments, the Status object may indicate success or failure of requested actions, discussed above. The Status object, in some embodiments, includes a Status Code field that contains a value that indicates the success or failure (e.g., a status code of "1" indicates success and a status code of "2" indicates failure), a Reason field that indicates a reason for a failure when the Status Code field indicates a failure, a Reserved field that is set to zero is sent by a transmitting PCEP network element and ignored by a receiving PCEP network element, and an Optional TLVs field which optionally may contain additional TLV, a content of which is not limited herein. A length of the Status object may be determined, in some embodiments, according to a quantity of additional TLVs contained in the Optional TLVs field, (e.g., 32 bits plus a size of the additional TLVs), a particular value of which is not limited herein.

Referring now to FIG. 36, an embodiment of a top label object is shown. The top label object may be implemented in any of the messages according to various embodiments of the present disclosure to indicate a label associated with a path segment in an E2E tunnel, as assigned by a PCE controller (e.g., the parent PCE controller 106 and/or any one or more of the child PCE controllers 108). For example, the top label object is suitable for implementation, in some embodiments, in the various messages as depicted in the protocol diagram 2400 of FIG. 24, for example, in a <Label> field. For example, in at least some embodiments, the top label object comprises a single label, discussed above, that is encoded in 4 octets. A length of the top label object may be determined, in some embodiments, according to a length of the single label assigned by a child PCE controller, a particular value of which is not limited herein.

Referring now to FIG. 37, an embodiment of an Interface Index object is shown. The Interface Index object may be implemented in any of the messages according to various embodiments of the present disclosure to indicate an index for an interface assigned by a child PCE controller and associated with a path segment in an E2E tunnel. For example, the Interface Index object is suitable for implementation, in the various messages transmitted between a parent PCE controller (e.g., the parent PCE controller 106) and a child PCE controller (e.g., any one or more of the child PCE controllers 108) as depicted in the protocol diagram 2400 of FIG. 24, for example, in an <Interface>field. The Interface Index object may be identified by an object class and an object type, each of which may be numeric values that are assigned to the Interface Index object at a later time, and a particular value of the object class and object type of the Interface Index object is not limited herein. In at least some embodiments, a length of the Interface Index object may be determined, according to a length of the interface index which may be a single interface index that is encoded in 4 octets.

Referring now to FIG. 38, an embodiment of an Interface IPv4 Address object is shown. The Interface IPv4 Address object may be implemented in any of the messages according to various embodiments of the present disclosure to indicate an IPv4 address for an interface assigned by a child PCE controller and associated with a path segment in an E2E tunnel. For example, the Interface IPv4 Address object is suitable for implementation, in some embodiments, in the various messages transmitted between a parent PCE controller (e.g., the parent PCE controller 106) and a child PCE controller (e.g., any one or more of the child PCE controllers 108) as depicted in the protocol diagram 2400 of FIG. 24, for example, in an <Interface>field. The Interface IPv4 Address object may be identified by an object class and an object type, each of which may be numeric values that are assigned to the Interface IPv4 Address object at a later time, and a particular value of the object class and object type of the Interface IPv4 Address object is not limited herein. In at least some embodiments, a length of the Interface IPv4 Address object may be determined, according to a length of the interface address which may be, for example, 32 bits in length.

Referring now to FIG. 39, an embodiment of a format of an object is shown. The object is suitable for implementation in any of the messages according to various embodiments of the present disclosure. For example, the object is suitable for implementation, in some embodiments, in the various messages transmitted between a parent PCE controller (e.g., the parent PCE controller 106) and a child PCE controller (e.g., any one or more of the child PCE controllers 108) as depicted in the protocol diagram 2400 of FIG. 24. Each of the objects of the various embodiments of the present disclosure (e.g., CRP object, Local-Controller object, Remote-Controller object, Connection and Access object, Node object, Tunnel object, Status object, Label object, Interface object, etc.), in some embodiments, may be formatted according to the format of the object shown in FIG. 39. The object format, as shown in FIG. 39, includes an Object Class field, an Object Type field, a Reserved Field, a Processing Rule Flag, an Ignore Flag, an Object Length field, and an Object Body field. The Object Class and Object Type may be numeric values that are assigned to an object (e.g., the tunnel or status object) at a later time and uniquely identify each object disclosed herein, and a particular value of either is not limited herein. The Reserved Field is set to "0" by a transmitting PCEP network element and ignored by a receiving PCEP network element. The Processing Rule flag indicates to a receiving PCEP network element whether the object must be taken into account by the receiving PCEP network element (e.g., when the Processing Rule flag is set to "1") or when the receiving PCEP network element may ignore the object (e.g., when the Processing Rule flag is set to "0"). The Ignore Flag indicates whether an optional object was processed by a PCEP network element (e.g., where the Ignore Flag being set to "0" indicates that the optional object was processed and the Ignore Flag being "1" indicates that the optional object was not processed). The Object Length is a total length of the object, including the object header, and is indicated in bytes. A particular value of the Object Length may depend on a content of the Object Body, and a particular value of the Object Length is not limited herein. The Object Body contains any one or more of the various values disclosed herein.

Figure 40:
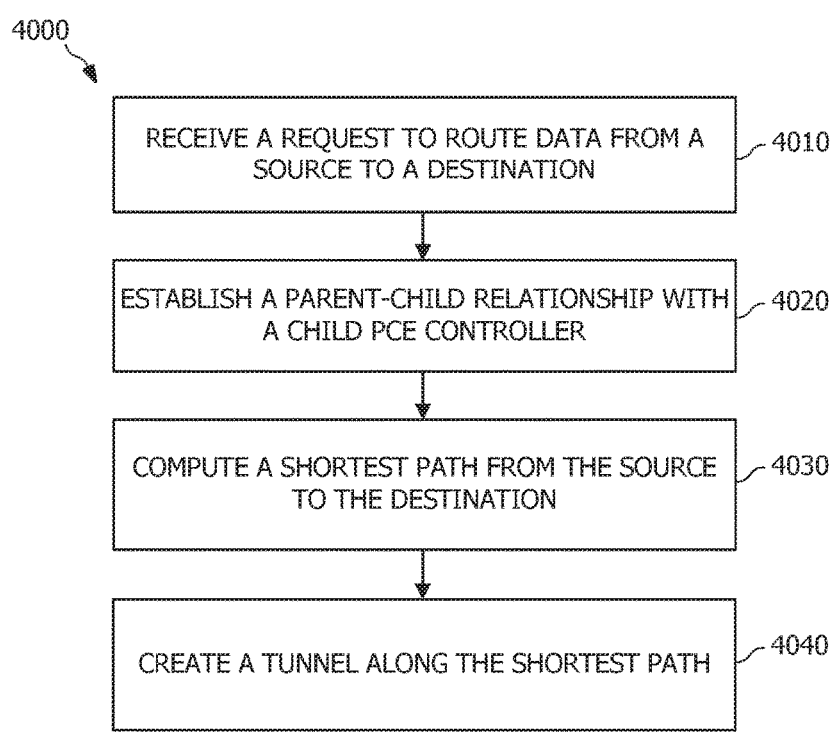
FIG. 40 is a flowchart of an embodiment of a method for creating a tunnel.

Referring now to FIG. 40, a flowchart of an embodiment of a method 4000 for creating a tunnel is shown. The method 4000 is implemented by a PCEP network element (e.g., the parent PCE controller 106) when the PCEP network element wishes to create an E2E tunnel in a PCE architecture (e.g., when a parent PCE controller wishes to create an E2E tunnel crossing through multiple domains controlled by child PCE controllers, such as any one or more of the child PCE controllers 108) in response to receiving a request to create the E2E tunnel and/or route data traffic from a source to a destination). At step 4010, a parent PCE controller receives a request to route data from a source to a destination. The source and the destination, in some embodiments, are network elements within a same domain, and in other embodiments, are network elements within different domains.

As step 4020, the parent PCE controller establishes a parent-child relationship with a child PCE controller. The parent PCE controller, in some embodiments, establishes the parent-child relationship by transmitting one or more Open messages, as discussed above with respect to the protocol diagram 300 of FIG. 3, or by transmitting one or more Discovery messages, as discussed above with respect to the protocol diagram 500 of FIG. 5. At step 4030, the parent PCE controller computes a shortest path from the source to the destination. In some embodiments, the parent PCE controller computes the shortest path from the source to the destination according to a shortest path tree (SPT) constructed by the parent PCE controller. The SPT is constructed by the parent PCE controller using the source as a root node of the SPT and adding one or more nodes to the SPT until the SPT includes both the source and the destination. To construct the SPT, the parent PCE controller selects a node last added to the SPT and determines whether the node is the destination. When the last added node is the destination, the parent PCE controller stops computing the shortest path since an E2E path from the source to the destination is contained in the SPT. When the last added node is not the destination, the parent PCE controller transmits a request message to child PCE controller that controls a domain that includes the last added node, where the request message requests the child PCE controller to compute one or more path segments corresponding to the child PCE controller's domain. The request message is, in some embodiments, a PSReq message as discussed above with respect to FIG. 24.

The parent PCE controller receives a reply message from the child PCE controller containing the path segments computed by the child PCE controller, where the path segments are identified as links having a start node and an end node, and where the reply message also includes a cost corresponding to each link. The reply message is, in some embodiments, a PSRep message as discussed above with respect to FIG. 24. After receiving the reply message, the parent PCE controller adds the links contained in the reply message to a candidate list that includes nodes which are candidates for inclusion in the SPT. The parent PCE controller then selects a node having a minimum associated cost, adds it to the SPT, and again determines whether the node last added to the SPT is the destination and repeats the above process until the node last added to the SPT is the destination.

For a parent PCE controller that is also a child PCE controller of an upper level parent PCE controller (e.g., a parent PCE controller having a higher position in a hierarchical relationship), the parent PCE controller computes path segments as described above and also records and maintains the computed path segments along with an association to the GTID and PID contained in the PSReq message received from the upper level parent PCE controller. Additionally, the parent PCE controller that is also a child PCE controller allocates a new GTID and PID for a PSReq message sent to child PCE controllers of the parent PCE controller that is also a child PCE controller and then transmits a PSReq message to each of its child PCE controllers.

At step 4040, the parent PCE controller creates a tunnel (e.g., an E2E tunnel, as discussed above) along the shortest path computed at step 4030. For a parent PCE controller that does not have a detailed knowledge of a topology of the domains of its child PCE controllers, after computing the shortest path from the source to the destination, the parent PCE controller transmits a child PCE controller a request message that requests that the child PCE controller create a tunnel segment in its respective domain that corresponds to the path segments of the shortest path that are located in their respective domains. The request message is, in some embodiments, a CTSReq message as discussed above with respect to FIG. 24.

The parent PCE controller receives a reply from the child PCE controller that indicates whether the tunnel segment creation succeeded or failed. The reply message is, in some embodiments, a CTSRep message as discussed above with respect to FIG. 24. When the tunnel segment creation fails, the parent PCE controller removes the tunnel segment (e.g., via a RTSReq message), and reports to the entity requesting the E2E tunnel from the source to the destination that the tunnel creation has failed. When the tunnel segment creation succeeds, if the child PCE controller that transmits the reply message contains the source within its domain, the E2E tunnel is completed and the parent PCE controller reports to the entity requesting the E2E tunnel from the source to the destination that the tunnel has been successfully created. When the tunnel segment creation succeeds and the child PCE controller that transmits the reply message does not contain the source within its domain, the reply message contains a label and an interface. The parent PCE controller then transmits another CTSReq message to a child PCE controller of a domain immediately upstream from the domain through which a tunnel segment was last successfully created and through which the computed shortest path crosses, where the CTSReq message includes the label and the interface from the reply message and enables the upstream domain to connect to the downstream domain to bridge the tunnel across the respective domains of the child PCE controllers along the computed shortest path.

For a parent PCE controller that does have a detailed knowledge of a topology of the domains of its child PCE controllers, after computing the shortest path from the source to the destination, the parent PCE controller creates tunnel segments substantially similar to the above with a modification to the CTSReq message content. When the parent PCE controller has the detailed knowledge, the parent PCE controller transmits a CTSReq message to a child PCE controller including a detailed listing of the path segment (e.g., an ERO comprising each hop along the path segment) along which the tunnel will be created.

For a parent PCE controller that is also a child PCE controller of a upper level parent PCE controller, the parent PCE controller computes path segments as described above by transmitting a PSReq and receiving a PSRep from each of its respective child PCE controllers.

Figure 41:
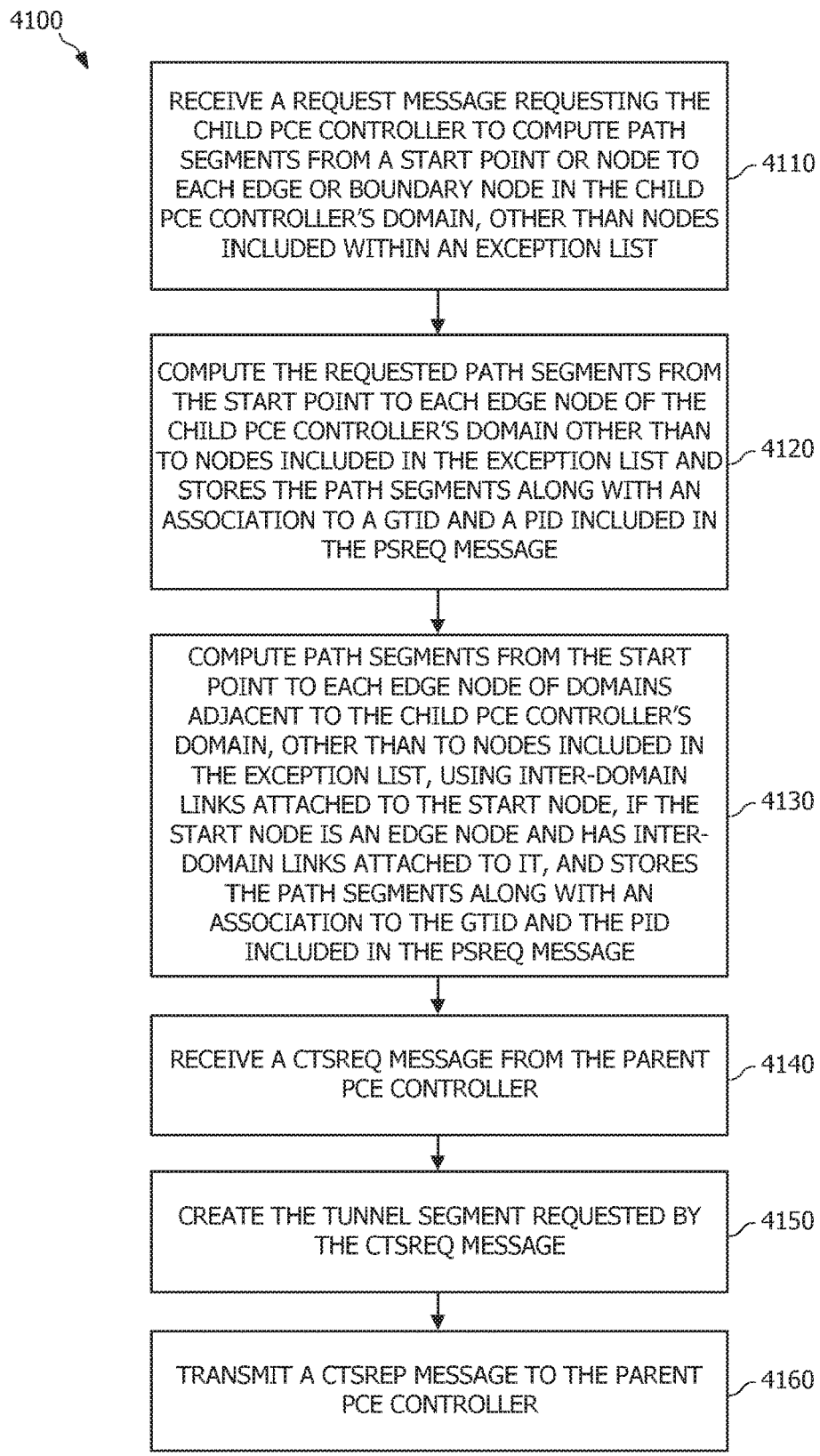
FIG. 41 is a flowchart of an embodiment of a method for creating a tunnel.

Referring now to FIG. 41, a flowchart of an embodiment of a method 4100 for creating a tunnel is shown. The method 4100 is implemented by a PCEP network element (e.g., any one or more of the child PCE controllers 108) when the PCEP network element wishes to create an E2E tunnel in a PCE architecture (e.g., when the child PCE controller receives a request to compute a path segment and/or create a tunnel segment, such as a request from the parent PCE controller 106). At step 4110, the child PCE controller receives a request message (e.g., the PSReq message discussed above) requesting the child PCE controller to compute path segments from a start point or node to each edge or boundary node in the child PCE controller's domain, other than nodes included within an exception list. In response to receiving the PSReq message, at step 4120, the child PCE controller computes the requested path segments from the start point to each edge node of the child PCE controller's domain other than to nodes included in the exception list and stores the path segments along with an association to a GTID and a PID included in the PSReq message.

At step 4130, the child PCE controller computes path segments from the start point to each edge node of domains adjacent to the child PCE controller's domain, other than to nodes included in the exception list, using inter-domain links attached to the start node, if the start node is an edge node and has inter-domain links attached to it, and stores the path segments along with an association to the GTID and the PID included in the PSReq message. In some embodiments, the child PCE controller also transmits a reply message (e.g., the PSRep message discussed above) to the parent PCE controller, where the reply message indicates success or failure of the path segment computation.

At step 4140, the child PCE controller receives a request message (e.g., the CTSReq message discussed above) from the parent PCE controller, wherein the CTSReq message requests the child PCE controller to create a tunnel segment corresponding to one or more path segments computed by the child PCE controller at either step 4120 or step 4130. At step 4150, the child PCE controller creates the tunnel segment requested by the CTSReq message. To create the tunnel segment, the child PCE controller reserves bandwidth for the tunnel segment, allocates labels for the tunnel segment along the corresponding path segment, and writes a cross connect on every node in the child PCE controller's domain that is included in the tunnel segment. When the child PCE controller's domain does not contain the destination, the CTSReq message includes a label and an interface for a next hop of an edge node of the child PCE controller's domain, and the child PCE controller writes a cross connect corresponding to the label and the interface to the edge node of the child PCE controller's domain.

At step 4160, the child PCE controller transmits a reply message (e.g., the CTSRep message discussed above) to the parent PCE controller, where the reply message indicates success or failure of the path segment computation and when the child PCE controller's domain does not include the source node, an incoming interface and a label for the next hop of an edge node of the domain of another child PCE controller immediate upstream to utilize in connecting to the domain of the child PCE controller sending the reply message.

It should be noted that for each of the above methods 4000 and 4100, the methods may include additional steps that are not recited herein, and one or more of the steps recited herein may include one or more sub-steps, any one or more of the steps recited herein may be omitted, and/or any one or more of the step recited herein may be performed in an order other than that presented herein, all of which is intended to fall within the scope of the present disclosure.

Figure 42:
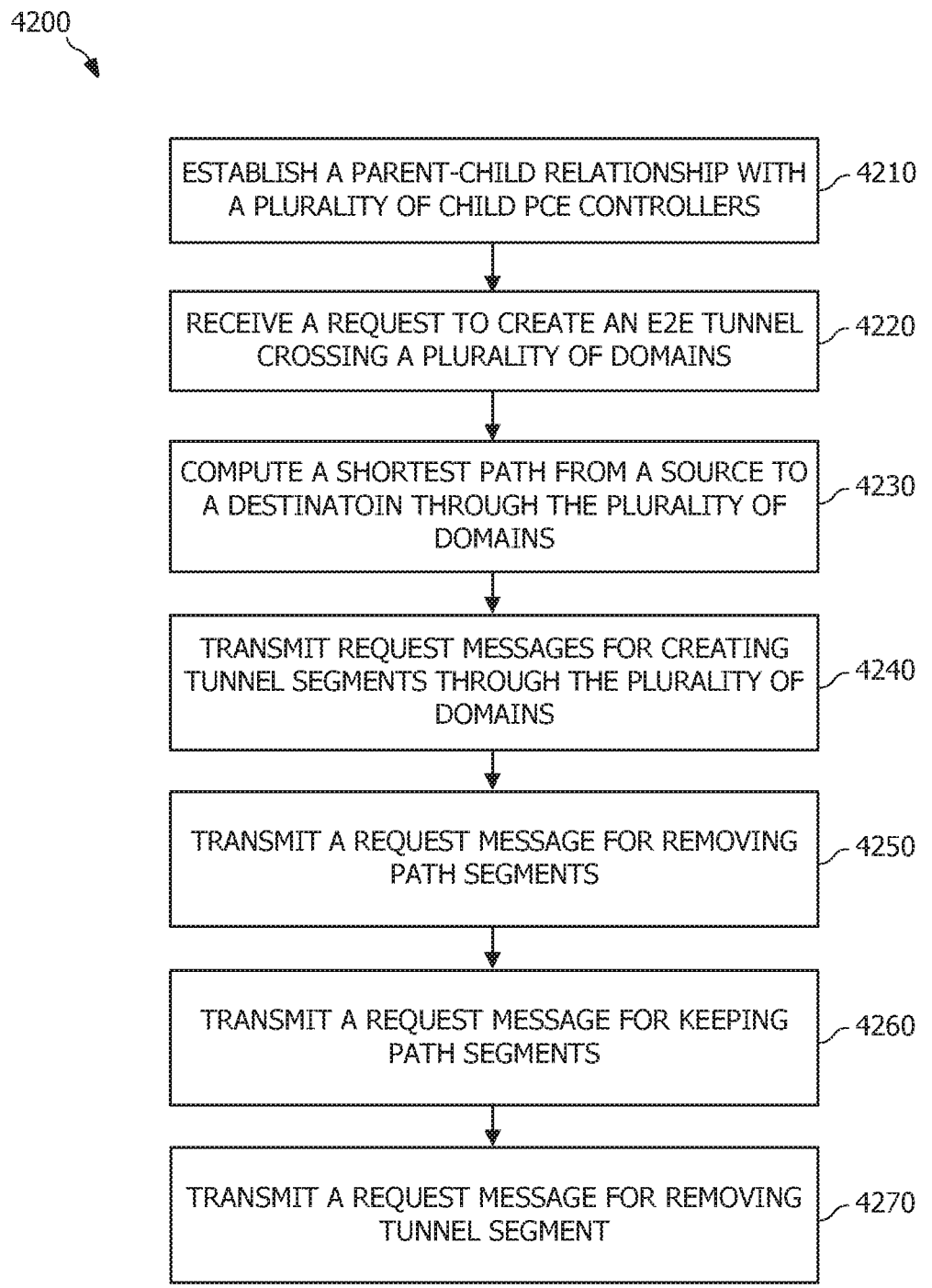
FIG. 42 is a flowchart of an embodiment of a method for creating a tunnel.

Referring now to FIG. 42, a flowchart of an embodiment of a method 4200 for creating a tunnel is shown. The method 4200 is implemented by a PCE controller (e.g., the parent PCE controller 106) when the PCE controller wishes to create an E2E tunnel in a PCE architecture (e.g., when a parent PCE controller wishes to create an E2E tunnel crossing through multiple domains controlled by child PCE controllers, such as any one or more of the child PCE controllers 108) in response to receiving a request to create the E2E tunnel and/or route data traffic from a source to a destination). At step 4210, the PCE controller establishes a parent-child relationship with a plurality of child PCE controllers (e.g., at least a first child PCE controller and a second child PCE controller). The plurality of child PCE controllers may each control respective domains such that at least some of the child PCE controllers are associated with separate domains than other child PCE controllers (e.g., a first domain controller by the first child PCE controller and a second domain controller by the second child PCE controller). The PCE controller establishes the parent-child relationship according to, for example, transmission to, and/or receipt from, a child PCE controller of one or more HSCS Capability TLVs (e.g., as discussed above with respect to the protocol diagrams 300 and 400 of FIGS. 3 and 4, respectively) and/or one or more Discovery messages (e.g., as discussed above with respect to the protocol diagram 500 of FIG. 5). At step 4220, the PCE controller receives a request to create an E2E tunnel crossing the first domain and the second domain. For example, the E2E tunnel may be from a source located in the first domain to a destination located in the second domain. A point of origination for the request may be, in various embodiments, the source, a network administrator, the destination, or any other suitable point of origination which is not limited herein.

At step 4230, the PCE controller computes a shortest path from the source to the destination through the first domain and the second domain. The PCE controller computes the shortest path, for example, by transmitting requests for computing path segments to the plurality of child PCE controllers, receiving replies from the plurality of child PCE controllers, where the replies include path segments through the respective domains controlled by the plurality of child PCE controllers, and computing the shortest path according to the received path segments. The requests and replies for computing path segments are transmitted and/or received, for example, according to the protocol diagram 2400 of FIG. 24.

At step 4240, the PCE controller transmits a first request message to the first child PCE controller for creating a first tunnel segment through the first domain, and the PCE controller transmits a second request message to the second child PCE controller for creating a second tunnel segment through the second domain. In some embodiments, the first request message indicates each node in the first domain through which the first tunnel segment should pass and the second request message indicates each node in the second domain through which the second tunnel segment should pass. In other embodiments, the first request message indicates a start node and an end node in the first domain for the first tunnel segment and the second request message indicates a start node and an end node in the second domain for the second tunnel segment.

Optionally, at step 4250, the PCE controller transmits a request for removing path segments to one or more of the child PCE controllers. The request for removing path segments requests that a receiving child PCE controller remove path segments that were previously computed and stored by the child PCE controller. The PCE controller may receive a reply for removing path segments from the child PCE controller, where the reply indicates whether path segment removal was successful. The requests and replies for removing path segments are transmitted and/or received, for example, according to the protocol diagram 2400 of FIG. 24.

Optionally, at step 4260, the PCE controller transmits a request for keeping path segments to one or more of the child PCE controllers. The request for keeping path segments requests that a receiving child PCE controller keep path segments that were previously computed and stored by the child PCE controller and enables the child PCE controller to remove path segments that were previously computed and stored by the child PCE controller and are not identified in the request for keeping path segments. The PCE controller may receive a reply for keeping path segments from the child PCE controller, where the reply indicates whether path segment keeping was successful. The requests and replies for keeping path segments are transmitted and/or received, for example, according to the protocol diagram 2400 of FIG. 24.

Optionally, at step 4270, the PCE controller transmits a request for removing tunnel segment to one or more of the child PCE controllers. The request for removing tunnel segment requests that a receiving child PCE controller remove a tunnel segment that were previously created by the child PCE controller. The PCE controller may receive a reply for removing tunnel segment from the child PCE controller, where the reply indicates whether tunnel segment removal was successful. The requests and replies for removing tunnel segment are transmitted and/or received, for example, according to the protocol diagram 2400 of FIG. 24.

Figure 43:
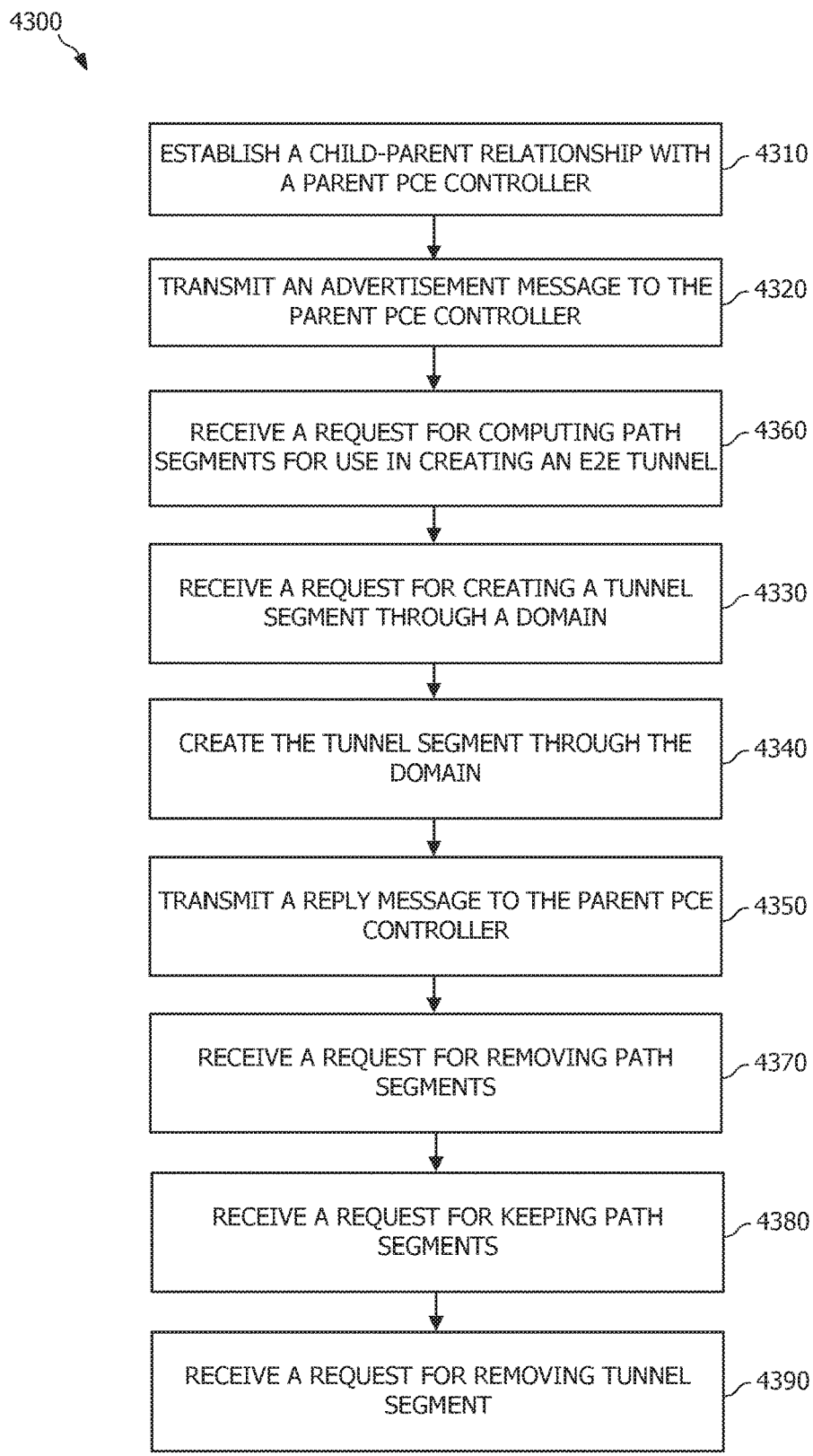
FIG. 43 is a flowchart of an embodiment of a method for creating a tunnel.

Referring now to FIG. 43, a flowchart of an embodiment of a method 4300 for creating a tunnel is shown. The method 4300 is implemented by a child PCE controller (e.g., any one or more of the child PCE controllers 108) when the child PCE controller wishes to create an E2E tunnel (e.g., through a domain controlled by the child PCE controller) in a PCE architecture w (e.g., when the child PCE controller receives a request to compute a path segment and/or create a tunnel segment, such as a request from the parent PCE controller 106). At step 4310, the child PCE controller establishes a child-parent relationship with a parent PCE controller (e.g., the parent PCE controller 106). The PCE controller establishes the child-parent relationship according to, for example, transmission to, and/or receipt from, the parent PCE controller of one or more HSCS Capability TLVs (e.g., as discussed above with respect to the protocol diagrams 300 and 400 of FIGS. 3 and 4, respectively) and/or one or more Discovery messages (e.g., as discussed above with respect to the protocol diagram 500 of FIG. 5).

At step 4320, the child PCE controller transmits an advertisement message to the parent PCE controller, where the advertisement message indicates connections and accesses of the child PCE controller. The advertisement message is, for example, a CAAdv message as discussed above. At step 4330, the child PCE controller receives a request for creating a tunnel segment through the domain controlled by the child PCE controller, where the request message indicates at least a start node and an end node each located in the domain controlled by the child PCE controller. At step 4340, the child PCE controller creates the tunnel segment according to the request message, for example, by assigning labels and writing cross connects to nodes located along a path of the tunnel segment. At step 4350, the PCE controller transmits a reply message to the parent PCE controller, where the reply message indicates a status of creation of the tunnel segment. The requests and replies for creating tunnel segment are transmitted and/or received, and the tunnel segment is created, for example, according to the protocol diagram 2400 of FIG. 24.

Optionally, before receiving the request for creating a tunnel segment through the domain controlled by the child PCE controller, at step 4360, the child PCE controller receives a request for computing path segments for use in creating the E2E tunnel, where each path segment connects one edge node of the domain controlled by the child PCE controller to another edge node of the domain controlled by the child PCE controller, and where the request includes a GTID and a PID. In response to receiving the request for computing path segments, the child PCE controller computes the path segments, stores details of the path segments, and transmits a reply message to the parent PCE controller indicating a start node, an end node, and a cost for each of the computed path segments. The requests and replies for computing path segments are transmitted and/or received, and the path segments are computed and stored, for example, according to the protocol diagram 2400 of FIG. 24.

Optionally, at step 4370, the child PCE controller receives a request for removing path segments computed and stored by the child PCE controller. In response to receiving the request for removing path segments, the child PCE controller removes the stored path segments that are identified in the request for removing path segments and transmits a reply message to the parent PCE controller indicating a status of the path segment removal. The requests and replies for removing path segments are transmitted and/or received, and the path segments are removed, for example, according to the protocol diagram 2400 of FIG. 24.

Optionally, at step 4380, the child PCE controller receives a request for keeping path segments computed and stored by the child PCE controller. In response to receiving the request for keeping path segments, the child PCE controller keeps the stored path segments that are identified in the request for keeping path segments, removes path segments that were computed and stored by the child PCE controller and are not identified in the request for keeping path segments, and transmits a reply message to the parent PCE controller indicating a status of the path segment keeping. The requests and replies for keeping path segments are transmitted and/or received, and the path segments are kept, for example, according to the protocol diagram 2400 of FIG. 24.

Optionally, at step 4390, the child PCE controller receives a request for removing tunnel segment. In response to receiving the request for removing tunnel segment, the child PCE controller removes the tunnel segment identified in the request for removing tunnel segment (e.g., by releasing allocated or reserved bandwidth, labels, and/or cross connects) and transmits a reply message to the parent PCE controller indicating a status of the tunnel segment removal. The requests and replies for removing tunnel segment are transmitted and/or received, and the tunnel segment is removed, for example, according to the protocol diagram 2400 of FIG. 24.

Figure 44:
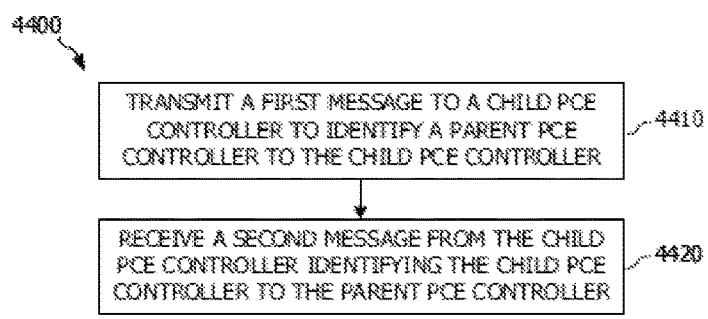
FIG. 44 is a flowchart of an embodiment of a method for performing parent-child discovery.

Referring now to FIG. 44, a flowchart of an embodiment of a method 4400 for performing parent-child discovery is shown. The method 4400 is implemented by a parent PCE controller (e.g., the parent PCE controller 106) when the parent PCE controller wishes to establish a parent-child relationship with a child PCE controller (e.g., any one or more of the child PCE controllers 108). At step 4410, the parent PCE controller transmits a first message to the child PCE controller, where the first message identified the parent PCE controller to the child PCE controller. At step 4420, the parent PCE controller receives a second message from the child PCE controller, where the second message identifies the child PCE controller to the parent PCE controller. Each of the first message and the second message, in some embodiments, includes an HSCS Capability TLV to indicate capabilities of the parent PCE controller and the child PCE controller. The HSCS Capability TLV is, for example, transmitted and received according to the protocol diagram 300 and 400 of FIGS. 3 and 4, respectively, as discussed above. In other embodiments, each of the first message and the second message is a Discovery message used to indicate an identity of a local and a remote controller. The Discovery message is, for example, transmitted and received according to the protocol diagram 500 of FIG. 5, as discussed above.

Figure 45:
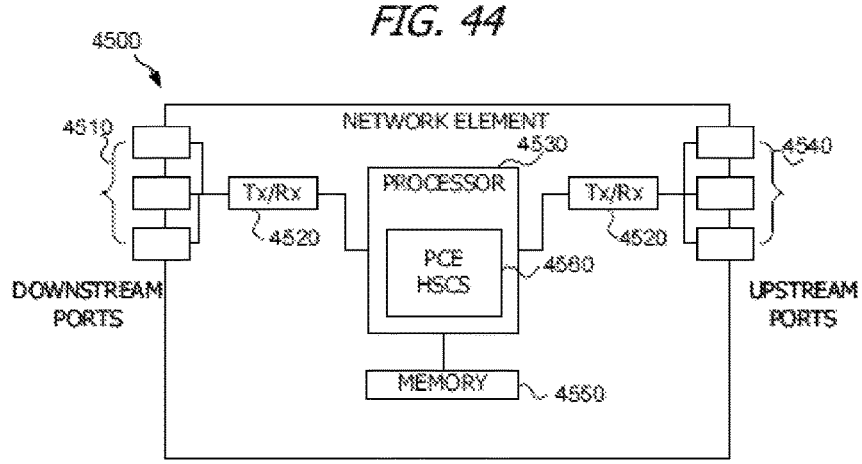
FIG. 45 is an embodiment of a network element suitable for implementing various embodiments of the present disclosure.

Referring now to FIG. 45, a schematic diagram of a network element 4500 according to various embodiments is shown. Network element 4500 may be any suitable processing device capable of performing the functions disclosed herein such as a PCEP network element and/or controller capable of operation within a PCE architecture such as the PCE architecture 100. For example, the network element 4500 is suitable for implementation as a parent PCE controller 106, any one or more child PCE controllers 108, a second level parent PCE controller 110, any one or more second level child PCE controllers 112, and/or a node 114, each as discussed above with reference to FIG. 1. Network element 4500 is configured to implement at least some of the features/methods disclosed herein, communicate according to at least some of the protocol diagrams disclosed herein, and/or transmit or receive any one or more of the messages and/or objects disclosed herein. In various embodiments, for instance, the features/methods of this disclosure are implemented using hardware, firmware, and/or software installed to run on hardware.

Network element 4500 is a device (e.g., an access point, an access point station, a router, a switch, a gateway, a bridge, a server, a client, a user-equipment, a mobile communications device, etc.) that transports data through a network, system, and/or domain, and/or provides services to other devices in a network or performs computational functions. In one embodiment, the network element 4500 is an apparatus and/or system configured to implement the PCE HSCS disclosed herein.

The network element 4500 comprises one or more downstream ports 4510 coupled to a transceiver (Tx/Rx) 4520, which are transmitters, receivers, or combinations thereof The Tx/Rx 4520 transmits and/or receives frames from other network elements via the downstream ports 4510. Similarly, the network element 4500 comprises another Tx/Rx 4520 coupled to a plurality of upstream ports 4540, wherein the Tx/Rx 4520 transmits and/or receives frames from other nodes via the upstream ports 4540. The downstream ports 4510 and/or the upstream ports 4540 may include electrical and/or optical transmitting and/or receiving components. In another embodiment, the network element 4500 comprises one or more antennas (not shown) coupled to the Tx/Rx 4520. The Tx/Rx 4520 transmits and/or receives data (e.g., packets) from other computing or storage devices wirelessly via the one or more antennas.

A processor 4530 is coupled to the Tx/Rx 4520 and is configured to determine sufficiency of domain adaptation of a client domain, for example, by determining a threshold for sufficiency of domain adaptation. In an embodiment, the processor 4530 comprises one or more multi-core processors and/or memory modules 4550, which functions as data stores, buffers, etc. The processor 4530 is implemented as a general processor or as part of one or more application specific integrated circuits (ASICs), field-programmable gate arrays (FPGAs), and/or digital signal processors (DSPs). Although illustrated as a single processor, the processor 4530 is not so limited and alternatively comprises multiple processors. The processor 4530 further comprises processing logic configured to execute a PCE HSCS computer program product 4560 that is configured to perform hierarchical control of PCEP network elements to create a parent-child (or child-parent) relationship between two PCEP network elements, to compute a shortest path across multiple domains from a source to a destination, and/or to create an E2E tunnel.

FIG. 45 also illustrates that a memory module 4550 is coupled to the processor 4530 and is a non-transitory medium configured to store various types of data. Memory module 4550 comprises memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage is used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 4550 may be used to house the instructions for carrying out the various embodiments described herein. For example, the memory module 4550 may comprise the PCE HSCS computer program product 4560, which is executed by processor 4530.

It is understood that by programming and/or loading executable instructions onto the network element 4500, at least one of the processor 4530 and/or the memory module 4550 are changed, transforming the network element 4500 in part into a particular machine or apparatus, for example, a domain adaptation device having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and will be produced in large volume may be preferred to be implemented in hardware (e.g., in an ASIC) because for large production runs the hardware implementation may be less expensive than software implementations. Often a design may be developed and tested in a software form and then later transformed, by design rules well-known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Disclosed herein is a network element configured with a means for implementing PCE HSCS. The network element includes means for establishing a parent-child relationship with at least a first child PCE controller and a second child PCE controller, wherein the first child PCE controller controls a first domain, and wherein the second child PCE controller controls a second domain, means for receiving a request to create an E2E tunnel crossing the first domain and the second domain, wherein a source of the E2E tunnel is located in the first domain, and wherein a destination of the E2E tunnel is located in the second domain, means for compute a shortest path from the source to the destination through the first domain and the second domain; transmitting a request message to the first child PCE controller for creating a first tunnel segment of the E2E tunnel through the first domain; and means for transmitting a request message to the second child PCE controller for creating a second tunnel segment of the E2E tunnel through the second domain, wherein the first tunnel segment and the second tunnel segment together comprise the E2E tunnel.

Additional embodiments are cited in the following clauses.

Clause 1. A parent PCE controller comprising:
a memory comprising instructions executable by a processor; and
a processor coupled to the memory and configured to execute the instructions, wherein executing the instructions causes the processor to:
establish a parent-child relationship with at least a first child PCE controller and a second child PCE controller, wherein the first child PCE controller controls a first domain, and wherein the second child PCE controller controls a second domain;
receive a request to create an E2E tunnel crossing the first domain and the second domain, wherein a source of the E2E tunnel is located in the first domain, and wherein a destination of the E2E tunnel is located in the second domain;
compute a shortest path from the source to the destination through the first domain and the second domain;
transmit a request message to the first child PCE controller for creating a first tunnel segment of the E2E tunnel through the first domain; and
transmit a request message to the second child PCE controller for creating a second tunnel segment of the E2E tunnel through the second domain, wherein the first tunnel segment and the second tunnel segment together comprise the E2E tunnel.

Clause 2. The parent PCE controller of clause 1, wherein executing the instructions further causes the processor to:
transmit a first request for computing path segments to the first child PCE controller to cause the first child PCE controller to compute at least a first path segment from the source to a first edge node of the first domain;
transmit a second request for computing path segments to the second child PCE controller to cause the second child PCE controller to compute at least a second path segment from a second edge node of the second domain to the destination;
receive a first reply for computing path segments message from the first child PCE controller, wherein the first reply for computing path segments message identifies the first path segment to the parent PCE controller;
receive a second reply for computing path segments message from the second child PCE controller, wherein the second reply for computing path segments message identifies the second path segment to the parent PCE controller; and
compute the shortest path from the source to the destination through the first domain and the second domain according to the first path segment and the second path segment.

Clause 3. The parent PCE controller of any of clauses 1-2, wherein transmitting the request message to the first child PCE controller for creating the first tunnel segment of the E2E tunnel through the first domain comprises transmitting a Request for Creating Tunnel Segment message to the first child PCE controller, and wherein the Request for Creating Tunnel Segment message comprises a list of each node of the first domain through which the first tunnel segment should pass.

Clause 4. The parent PCE controller of any of clauses 1-3, wherein transmitting the request message to the first child PCE controller for creating the first tunnel segment of the E2E tunnel through the first domain comprises transmitting a Request for Creating Tunnel Segment message to the first child PCE controller, wherein the Request for Creating Tunnel Segment message comprises a start node of the first tunnel segment and an end node of the first tunnel segment, wherein the start node and the end node are nodes within the first domain, and wherein the start node and the end node identify a link that indicates to the first child PCE controller each node of the first domain from the start node to the end node through which the first tunnel segment should pass.

Clause 5. The parent PCE controller of and of clauses 1-4, wherein establishing the parent-child relationship with at least the first child PCE controller comprises transmitting an Open message to the first child PCE controller, wherein the Open message comprises a HSCS TLV, and wherein the HSCS TLV comprises a plurality of capability flags configured to convey HSCS capabilities of the parent PCE controller to the first child PCE controller.

Clause 6. The parent PCE controller of any of clauses 1-5, wherein the capability flags comprise:
a Parent Controller flag configured to indicate functionality as a parent PCE controller;
a Child Controller flag configured to indicate functionality as a child PCE controller;
a Path Segments flag configured to indicate support for computing path segments for HSCS;
a Tunnel Segment flag configured to indicate support for creating tunnel segments for HSCS; and
an E2E flag configured to indicate support for creating and maintaining an E2E LSP tunnel.

Clause 7. The parent PCE controller of any of clauses 1-6, wherein establishing the parent-child relationship with at least the first child PCE controller comprises transmitting a Discovery message to the first child PCE controller, and wherein the Discovery message comprises:
a local controller object configured to indicate an identity of a local PCE controller; and
a remote controller object configured to indicate an identity of a remote PCE controller.

Clause 8. The parent PCE controller of any of clauses 1-7, wherein executing the instructions further causes the processor to:
transmit a request for removing path segments message to the first child PCE controller to cause the first child PCE controller to remove path segments computed and stored by the first child PCE controller, wherein the request for removing path segments message indicates one or more of the path segments computed and stored by the first child PCE controller; and
receive a first reply for removing path segments message from the first child PCE controller, wherein the first reply for removing path segments message indicates a status of removal of the path segments identified in the request for removing path segments message.

Clause 9. The parent PCE controller of any of clauses 1-8, wherein executing the instructions further causes the processor to:
transmit a request for keeping path segments message to the first child PCE controller to cause the first child PCE controller to keep path segments computed and stored by the first child PCE controller, wherein the request for keeping path segments message indicates one or more of the path segments computed and stored by the first child PCE controller and which are included in the shortest path computed by the parent PCE controller; and receive a first reply for keeping path segments message from the first child PCE controller, wherein the first reply for keeping path segments message indicates a status of keeping the path segments identified in the request for keeping path segments message.

Clause 10. The parent PCE controller of and of clauses 1-9, wherein executing the instructions further causes the processor to:
transmit a request for removing tunnel segment message to the first child PCE controller to cause the first child PCE controller to remove the first tunnel segment; and
receive a first reply for removing tunnel segment message from the first child PCE controller, wherein the first reply for removing tunnel segment message indicates a status of removal of the first tunnel segment identified in the request for removing tunnel segment message.

Clause 11. The parent PCE controller of any of clauses 1-10, wherein the parent PCE controller is a child PCE controller of an upper level PCE controller.

Clause 12. A child PCE controller configured to control a first domain comprising:
a memory comprising instructions executable by a processor; and
a processor coupled to the memory and configured to execute the instructions, wherein executing the instructions causes the processor to:
establish a child-parent relationship with a parent PCE controller;
transmit an advertisement message to the parent PCE controller, wherein the advertisement message indicates connections and accesses of the first domain;
receive a request message from the parent PCE controller for creating a tunnel segment of an end-to-end (E2E) tunnel through the first domain, wherein the request message indicates at least a start node and an end node for the tunnel segment, and wherein the start node and the end node are located within the first domain;
create the tunnel segment according to the request message; and
transmit a reply message to the parent PCE controller, wherein the reply message indicates a status of creation of the tunnel segment.

Clause 13. The child PCE controller of clause 12, wherein executing the instructions further causes the processor to:
receive a request for computing path segments for use in creating the E2E tunnel, wherein each path segment connects one edge node of the first domain to another edge node of the first domain, and wherein the request for computing path segments includes a GTID and a PID;
compute the path segments according to the request for computing path segments;
store details of the computed path segments along with an association to the GTID and the PID; and
transmit a reply for computing path segments message to the parent PCE controller, wherein the path segment reply message comprises a plurality of links and a plurality of costs, wherein each of the plurality of links is associated with a corresponding cost in the plurality of costs, wherein each of the plurality of links comprises a start node and an end node of a computed path segment, and wherein each of the plurality of costs indicates a computational cost of traversing the link with which the cost is associated.

Clause 14. The child PCE controller of any of clauses 12-13, wherein creating the tunnel segment according to the request message comprises:
assigning labels along a path received from the parent PCE controller in the request message; and
writing cross connects between nodes along the path received from the parent PCE controller in the request message.

Clause 15. The child PCE controller of and of clauses 12-14, wherein creating the tunnel segment according to the request message comprises:

determining a computed path segment corresponding to a link received from the parent PCE controller in the request message;

assigning labels along the computed path segment; and writing cross connects between nodes along the computed path segment.

Clause 16. The child PCE controller of any of clauses 12-15, wherein establishing the child-parent relationship with the parent PCE controller comprises transmitting an Open message to the parent PCE controller, wherein the Open message comprises a HSCS TLV, and wherein the HSCS TLV comprises a plurality of capability flags configured to convey HSCS capabilities of the child PCE controller to the parent PCE controller.

Clause 17. The child PCE controller of any of clauses 12-16, wherein the capability flags comprise:

a Parent Controller flag configured to indicate functionality as the parent PCE controller;

a Child Controller flag configured to indicate functionality as the child PCE controller;

a Path Segments flag configured to indicate support for computing path segments for HSCS;

a Tunnel Segment flag configured to indicate support for creating tunnel segments for HSCS; and an E2E flag configured to indicate support for creating and maintaining an E2E LSP tunnel.

Clause 18. The child PCE controller of any of clauses 12-17, wherein establishing the child-parent relationship with the parent PCE controller comprises transmitting a Discovery message to the parent PCE controller, and wherein the Discovery message comprises:

a local controller object configured to indicate an identity of a local PCE controller; and a remote controller object configured to indicate an identity of a remote PCE controller.

Clause 19. The child PCE controller of any of clauses 12-18, wherein executing the instructions further causes the processor to:

receive a request for removing path segments message from the parent PCE controller;

remove path segments computed and stored by the child PCE controller when the path segments are identified in the request for removing path segments message; and transmit a reply for removing path segments message to the parent PCE controller, wherein the reply for removing path segments message indicates a status of removal of the path segments identified in the request for removing path segments message.

Clause 20. The child PCE controller of any of clauses 12-19, wherein executing the instructions further causes the processor to:

receive a request for keeping path segments message from the parent PCE controller;

keep path segments computed and stored by the child PCE controller when the path segments are identified in the request for keeping path segments message;

remove path segments computed and stored by the child PCE controller when the path segments are not identified in the request for keeping path segments message; and transmit a reply for keeping path segments message to the parent PCE controller, wherein the reply for keeping path segments message indicates a status of keeping the path segments identified in the request for keeping path segments message.

Clause 21. The child PCE controller of any of clauses 12-20, wherein executing the instructions further causes the processor to:

receive a request for removing tunnel segment message from the parent PCE controller;

remove the tunnel segment when the tunnel segment is identified in the request for removing tunnel segment message; and transmit a reply for removing tunnel segment message to the parent PCE controller, wherein the reply for removing tunnel segment message indicates a status of removal of the tunnel segment when the tunnel segment is identified in the request for removing tunnel segment message.

Clause 22. The child PCE controller of any of clauses 12-21, wherein the child PCE controller is the parent PCE controller of a lower level child PCE controller.

Clause 23. A method for performing parent-child discovery comprising:

transmitting, by a parent PCE controller, a first message to a child PCE controller, wherein the first message identifies the parent PCE controller to the child PCE controller; and receiving, by the parent PCE controller, a second message from the child PCE controller, wherein the second message identifies the child PCE controller to the parent PCE controller.

Clause 24. The method of clause 23, wherein the first message and the second message are each Open messages, wherein the Open messages each comprises a HSCS TLV, and wherein the HSCS TLV comprises a plurality of capability flags configured to convey support for HSCS capabilities.

Clause 25. The method of any of clauses 23-24, wherein the capability flags comprise:

a Parent Controller flag configured to indicate functionality as the parent PCE controller;

a Child Controller flag configured to indicate functionality as the child PCE controller;

a Path Segments flag configured to indicate support for computing path segments for HSCS;

a Tunnel Segment flag configured to indicate support for creating tunnel segments for HSCS; and an end-to-end (E2E) flag configured to indicate support for creating and maintaining an E2E label switched path (LSP) tunnel.

Clause 26. The method of any of clauses 23-26, wherein the first message and the second message are each Discovery messages, and wherein each Discovery message comprises:

a local controller object configured to indicate an identity of a local PCE controller; and a remote controller object configured to indicate an identity of a remote PCE controller.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A parent path computation element (PCE) controller comprising:
   a memory comprising instructions executable by a processor; and
   a processor coupled to the memory and configured to execute the instructions, wherein executing the instructions causes the processor to:
      establish a parent-child relationship with at least a first child PCE controller controlling a first domain and a second child PCE controller controlling a second domain by transmitting an Open message to the first child PCE controller and the second child PCE controller, the Open message including a hierarchical software defined network (SDN) control system (HSCS) type-length-value (TLV), the HSCS TLV including a plurality of capability flags configured to convey HSCS capabilities of the parent PCE controller to the first child PCE controller and the second child PCE controller, the capability flags including a Parent Controller flag configured to indicate functionality as a parent PCE controller, a Child Controller flag configured to indicate functionality as a child PCE controller, a Path Segmentsflag configured to indicate support for computing path segments for HSCS, a Tunnel Segment flag configured to indicate support for creating tunnel segments for HSCS, and an E2E flag configured to indicate support for creating and maintaining an E2E label switched path (LSP) tunnel;
      receive a request to create an end-to-end (E2E) tunnel crossing the first domain and the second domain, a source of the E2E tunnel located in the first domain, and a destination of the E2E tunnel located in the second domain;
      compute a shortest path from the source to the destination through the first domain and the second domain;
      transmit a request message to the first child PCE controller for creating a first tunnel segment of the E2E tunnel through the first domain; and
      transmit a request message to the second child PCE controller for creating a second tunnel segment of the E2E tunnel through the second domain, the first tunnel segment and the second tunnel segment together forming the E2E tunnel.

2. The parent PCE controller of claim 1, wherein executing the instructions further causes the processor to:
   transmit a first request for computing path segments to the first child PCE controller to cause the first child PCE controller to compute at least a first path segment from the source to a first edge node of the first domain;
   transmit a second request for computing path segments to the second child PCE controller to cause the second child PCE controller to compute at least a second path segment from a second edge node of the second domain to the destination;
   receive a first reply for computing path segments message from the first child PCE controller, wherein the first reply for computing path segments message identifies the first path segment to the parent PCE controller;
   receive a second reply for computing path segments message from the second child PCE controller, wherein the second reply for computing path segments message identifies the second path segment to the parent PCE controller; and
   compute the shortest path from the source to the destination through the first domain and the second domain according to the first path segment and the second path segment.

3. The parent PCE controller of claim 1, wherein transmitting the request message to the first child PCE controller for creating the first tunnel segment of the E2E tunnel through the first domain comprises transmitting a Request for Creating Tunnel Segment message to the first child PCE controller, and wherein the Request for Creating Tunnel Segment message comprises a list of each node of the first domain through which the first tunnel segment should pass.

4. The parent PCE controller of claim 1, wherein transmitting the request message to the first child PCE controller for creating the first tunnel segment of the E2E tunnel through the first domain comprises transmitting a Request for Creating Tunnel Segment message to the first child PCE controller, wherein the Request for Creating Tunnel Segment message comprises a start node of the first tunnel segment and an end node of the first tunnel segment, wherein the start node and the end node are nodes within the first domain, and wherein the start node and the end node identify a link that indicates to the first child PCE controller each node of the first domain from the start node to the end node through which the first tunnel segment should pass.

5. The parent PCE controller of claim 1, wherein establishing the parent-child relationship with at least the first child PCE controller comprises transmitting a Discovery message to the first child PCE controller, and wherein the Discovery message comprises:
   a local controller object configured to indicate an identity of a local PCE controller; and
   a remote controller object configured to indicate an identity of a remote PCE controller.

6. The parent PCE controller of claim 1, wherein executing the instructions further causes the processor to:
   transmit a request for removing path segments message to the first child PCE controller to cause the first child PCE controller to remove path segments computed and stored by the first child PCE controller, wherein the request for removing path segments message indicates one or more of the path segments computed and stored by the first child PCE controller; and
   receive a first reply for removing path segments message from the first child PCE controller, wherein the first reply for removing path segments message indicates a status of removal of the path segments identified in the request for removing path segments message.

7. The parent PCE controller of claim 1, wherein executing the instructions further causes the processor to:
   transmit a request for keeping path segments message to the first child PCE controller to cause the first child PCE controller to keep path segments computed and stored by the first child PCE controller, wherein the request for keeping path segments message indicates one or more of the path segments computed and stored by the first child PCE controller and which are included in the shortest path computed by the parent PCE controller; and
   receive a first reply for keeping path segments message from the first child PCE controller, wherein the first reply for keeping path segments message indicates a status of keeping the path segments identified in the request for keeping path segments message.

8. The parent PCE controller of claim 1, wherein executing the instructions further causes the processor to:
   transmit a request for removing tunnel segment message to the first child PCE controller to cause the first child PCE controller to remove the first tunnel segment; and
   receive a first reply for removing tunnel segment message from the first child PCE controller, wherein the first reply for removing tunnel segment message indicates a status of removal of the first tunnel segment identified in the request for removing tunnel segment message.

9. The parent PCE controller of claim 1, wherein the parent PCE controller is a child PCE controller of an upper level PCE controller.

10. A child path computation element (PCE) controller configured to control a first domain comprising:
a memory comprising instructions executable by a processor; and
a processor coupled to the memory and configured to execute the instructions, wherein executing the instructions causes the processor to:
establish a child-parent relationship with a parent PCE controller by transmitting an Open message to the parent PCE controller, the Open message including a hierarchical software defined network (SDN) control system (HSCS) type-length-value (TLV), the HSCS TLV including a plurality of capability flags configured to convey HSCS capabilities of the child PCE controller to the parent PCE controller, the capability flags including a Parent Controller flag configured to indicate functionality as a parent PCE controller, a Child Controller flag configured to indicate functionality as a child PCE controller, a Path Segments flag configured to indicate support for computing path segments for HSCS, a Tunnel Segment flag configured to indicate support for creating tunnel segments for HSCS, and an E2E flag configured to indicate support for creating and maintaining an E2E label switched path (LSP) tunnel;
transmit an advertisement message to the parent PCE controller, the advertisement message indicating connections and accesses of the first domain;
receive a request message from the parent PCE controller for creating a tunnel segment of an end-to-end (E2E) tunnel through the first domain, the request message indicating at least a start node and an end node for the tunnel segment, and the start node and the end node located within the first domain;
create the tunnel segment according to the request message; and
transmit a reply message to the parent PCE controller, the reply message indicating a status of creation of the tunnel segment.

11. The child PCE controller of claim 10, wherein executing the instructions further causes the processor to:
receive a request for computing path segments for use in creating the E2E tunnel, wherein each path segment connects one edge node of the first domain to another edge node of the first domain, and wherein the request for computing path segments includes a global tunnel identification (GTID) and a path identification (PID);
compute the path segments according to the request for computing path segments;
store details of the computed path segments along with an association to the GTID and the PID; and
transmit a reply for computing path segments message to the parent PCE controller, wherein the path segment reply message comprises a plurality of links and a plurality of costs, wherein each of the plurality of links is associated with a corresponding cost in the plurality of costs, wherein each of the plurality of links comprises a start node and an end node of a computed path segment, and wherein each of the plurality of costs indicates a computational cost of traversing the link with which the cost is associated.

12. The child PCE controller of claim 10, wherein creating the tunnel segment according to the request message comprises:
assigning labels along a path received from the parent PCE controller in the request message; and
writing cross connects between nodes along the path received from the parent PCE controller in the request message.

13. The child PCE controller of claim 10, wherein creating the tunnel segment according to the request message comprises:
determining a computed path segment corresponding to a link received from the parent PCE controller in the request message;
assigning labels along the computed path segment; and
writing cross connects between nodes along the computed path segment.

14. The child PCE controller of claim 10, wherein establishing the child-parent relationship with the parent PCE controller comprises transmitting a Discovery message to the parent PCE controller, and wherein the Discovery message comprises:
a local controller object configured to indicate an identity of a local PCE controller; and
a remote controller object configured to indicate an identity of a remote PCE controller.

15. The child PCE controller of claim 10, wherein executing the instructions further causes the processor to:
receive a request for removing path segments message from the parent PCE controller;
remove path segments computed and stored by the child PCE controller when the path segments are identified in the request for removing path segments message; and
transmit a reply for removing path segments message to the parent PCE controller, wherein the reply for removing path segments message indicates a status of removal of the path segments identified in the request for removing path segments message.

16. The child PCE controller of claim 10, wherein executing the instructions further causes the processor to:
receive a request for keeping path segments message from the parent PCE controller;
keep path segments computed and stored by the child PCE controller when the path segments are identified in the request for keeping path segments message;
remove path segments computed and stored by the child PCE controller when the path segments are not identified in the request for keeping path segments message; and
transmit a reply for keeping path segments message to the parent PCE controller, wherein the reply for keeping path segments message indicates a status of keeping the path segments identified in the request for keeping path segments message.

17. The child PCE controller of claim 10, wherein executing the instructions further causes the processor to:
receive a request for removing tunnel segment message from the parent PCE controller;
remove the tunnel segment when the tunnel segment is identified in the request for removing tunnel segment message; and
transmit a reply for removing tunnel segment message to the parent PCE controller, wherein the reply for removing tunnel segment message indicates a status of removal of the tunnel segment when the tunnel segment is identified in the request for removing tunnel segment message.

18. The child PCE controller of claim 10, wherein the child PCE controller is the parent PCE controller of a lower level child PCE controller.

19. A method for performing parent-child discovery comprising:
transmitting, by a parent path computation element (PCE) controller, a first message to a child PCE controller, the first message identifying the parent PCE controller to the child PCE controller; and
receiving, by the parent PCE controller, a second message from the child PCE controller, wherein the second message identifying the child PCE controller to the parent PCE controller, wherein the first message and the second message are each Open messages, wherein the Open messages each comprises a hierarchical software defined network (SDN) control system (HSCS) type-length-value (TLV), and the HSCS TLV including a plurality of capability flags configured to convey support for HSCS capabilities, the capability flags including a Parent Controller flag configured to indicate functionality as a parent PCE controller, a Child Controller flag configured to indicate functionality as a child PCE controller, a Path Segments flag configured to indicate support for computing path segments for HSCS, a Tunnel Segment flag configured to indicate support for creating tunnel segments for HSCS, and an E2E flag configured to indicate support for creating and maintaining an E2E label switched path (LSP) tunnel.

20. The method of claim 19, wherein the first message and the second message are each Discovery messages, and wherein each Discovery message comprises:
   a local controller object configured to indicate an identity of a local PCE controller; and
   a remote controller object configured to indicate an identity of a remote PCE controller.

* * * * *

UNITED STATES PATENT AND TRADEMARK OFFICE
CERTIFICATE OF CORRECTION

PATENT NO. : 10,218,600 B2
APPLICATION NO. : 15/391319
DATED : February 26, 2019
INVENTOR(S) : Huaimo Chen Page 1 of 1

It is certified that error appears in the above-identified patent and that said Letters Patent is hereby corrected as shown below:

On the Title Page

Page 2, Column 2, Lines 13-18, should read:
Chen, et al., "ISIS Extensions in Support of Inter-Autonomous System (AS) MPLS and GMPLS Traffic Engineering," RFC 5316, Dec. 2008, 19 pages.
Chen, et al., "OSPF Extensions in Support of Inter-Autonomous System (AS) MPLS and GMPLS Traffic Engineering," RFC 5392, Jan. 2009, 17 pages.

Signed and Sealed this
Ninth Day of April, 2019

Andrei Iancu
*Director of the United States Patent and Trademark Office*